United States Patent
Kwak et al.

(10) Patent No.: US 8,736,440 B2
(45) Date of Patent: May 27, 2014

(54) EARLY ALERT SYSTEM AND METHOD FOR LIVESTOCK DISEASE DETECTION POWERED BY HYBRID ALTERNATIVE ENERGY SOURCES

(75) Inventors: Sung Bok Kwak, Milpitas, CA (US);
Yong Hyun Lee, Milpitas, CA (US);
Toan Tran, Milpitas, CA (US);
Sungryol Jin, Milpitas, CA (US);
Songtao Jin, Milpitas, CA (US)

(73) Assignee: Hana Micron America, Inc., Milpitas, CA (US)

( * ) Notice: Subject to any disclaimer, the term of this patent is extended or adjusted under 35 U.S.C. 154(b) by 269 days.

(21) Appl. No.: 13/286,199

(22) Filed: Oct. 31, 2011

(65) Prior Publication Data

US 2012/0326874 A1     Dec. 27, 2012

Related U.S. Application Data

(63) Continuation-in-part of application No. 13/166,520, filed on Jun. 22, 2011.

(51) Int. Cl.
*G08B 1/08*     (2006.01)
*G08B 23/00*    (2006.01)
*A01K 1/10*     (2006.01)

(52) U.S. Cl.
USPC ............... 340/539.12; 340/526; 340/573.3; 119/51.02; 119/51.11

(58) Field of Classification Search
USPC ............... 340/539.23, 526, 528, 573.3; 119/51.02, 51.11, 51.12
See application file for complete search history.

(56) References Cited

U.S. PATENT DOCUMENTS

| | | | |
|---|---|---|---|
| 3,370,296 A * | 2/1968 | Greenberg | 346/14 R |
| 4,618,861 A | 10/1986 | Gettens et al. | |
| 5,740,757 A * | 4/1998 | Smeester | 119/51.02 |
| 7,543,549 B2 * | 6/2009 | Valencia et al. | 119/174 |
| 7,670,292 B2 | 3/2010 | Haynes | |
| 7,705,736 B1 | 4/2010 | Kedziora | |
| 7,810,451 B2 | 10/2010 | Pratt | |
| 7,931,593 B2 | 4/2011 | Haynes et al. | |
| 8,185,101 B1 * | 5/2012 | Wiseman et al. | 455/422.1 |
| 8,220,569 B2 * | 7/2012 | Hassan | 180/2.2 |
| 8,307,785 B2 * | 11/2012 | Zimmerman et al. | 119/51.02 |
| 2007/0288249 A1 * | 12/2007 | Rowe et al. | 705/1 |
| 2009/0066511 A1 | 3/2009 | Okazaki | |
| 2012/0012069 A1 * | 1/2012 | Hempstead et al. | 119/712 |

* cited by examiner

*Primary Examiner* — Jennifer Mehmood
*Assistant Examiner* — Omar Casillashernandez
(74) *Attorney, Agent, or Firm* — Invent Capture, LLC.; Samuel S. Cho

(57) ABSTRACT

An early alert system and a method for livestock disease detection are disclosed. An activity measurement zone (AMZ) is defined near an incentive device (e.g. food or water dispensing system) with an RFID tag reader and/or an RFID antenna. An animal's access into the AMZ is tracked and counted with an RFID tag attached to the animal. If the animals' activity relative to the AMZ drops to an alarmingly low level (e.g. dropping below an alert trigger point) over time, then a user of the alert system is informed of a potential health problem of the animal and may also be encouraged to inspect the animal in person for further determination of its current health and potential medical issues. The early alert system may be powered by hybrid alternative energy sources for rural or remote areas, which may have inconvenient or expensive access to conventional electrical power lines.

18 Claims, 13 Drawing Sheets

An Embodiment of an Early Alert System for Livestock Disease Detection

300

Example of characteristics of an epidemic among animals in a livestock housing

400

Example of an alert trigger point for livestock disease detection

500

An Implemented Example of an Alternative Energy-Powered Early Alert System for Livestock Disease Detection

1000

An embodiment of a hybrid charge controller for an Early Alert System for Livestock Disease Detection A portable main controller unit

1200

| EPC / Tag Number | Time Table | | | | | Total Count |
|---|---|---|---|---|---|---|
| | 9:00 AM | 9:02 AM | 9:04 AM | ....... | ....... | |
| B10001 | 1 | 1 | 1 | | | 25 |
| B10002 | 1 | 1 | 1 | | | 20 |
| B10003 | | 1 | 1 | | | 3 |
| B10004 | 1 | | | | | 15 |
| B10005 | | | | | | 10 |

An example of a reporting format for an Early Alert System for Livestock Disease Detection

EARLY ALERT SYSTEM AND METHOD FOR LIVESTOCK DISEASE DETECTION POWERED BY HYBRID ALTERNATIVE ENERGY SOURCES

BACKGROUND OF THE INVENTION

The present invention generally relates to an early detection of a contagious disease in farm animals. More specifically, the present invention relates to an early alert system and method for livestock disease detection using an radio frequency identification (RFID) reader and an RFID tag assigned to an animal. Furthermore, the present invention also relates to an early alert system and method for livestock disease detection powered by hybrid alternative energy sources.

Outbreak and control of contagious diseases and epidemics have become an important concern in modern livestock farming industry. As farmers attempt to improve yield and efficiency of their livestock farms within available spaces, animals are often placed in space-constrained livestock housing and are highly susceptible to a rapid contagion of dangerous epidemics. For example, avian influenza outbreaks in chicken farms, mad cow disease in cattle farms, and foot-and-mouth disease outbreaks in various farm animals have become widespread, and early control of these outbreaks has become more difficult as high-efficiency livestock farming are likely causing even faster spread of the diseases among farm animals before any effective quarantine and treatment measures can take effect.

The conventional measure of detecting a disease in farm animals is generally slow and cumbersome. Farmers have to manually monitor conditions of each farm animals, typically contained in a livestock housing, and an animal suspected of being under the influence of a contagious disease is manually checked for its vital signs such as body temperature and heart rate. If this animal is confirmed to be infected of a dangerous or contagious disease, then it may be isolated from the flock for further treatment and handling. This conventional disease detection method is highly dependent on the level of experience and attention of a farmer monitoring the animals, thereby causing some serious medical conditions on a farm animal "slip through" the manual inspection process until the disease is further spread to other nearby animals. Furthermore, the process of checking the vital signs of an ill animal is a serialized, cumbersome, and slow process, and frequently causes delay in moving forward with quarantine, prevention, and/or treatment procedures of remaining animals.

Because any delay in quarantine, prevention, and treatment procedures during an outbreak of a contagious disease in a livestock farm can cause rapid infections to remaining animals, investment losses, and increased health risks to humans, it is highly desirable to devise an early alert system and a method for livestock disease detection. Furthermore, it may also be advantageous to utilize RFID tags attachable to animals for a systematic management of early detection of diseases for farm animals. In addition, it may be beneficial to design an early alert system and a method for livestock disease detection which can operate in remote areas or rural environment where electrical outlets are not readily available.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an early alert system for livestock disease detection at least partially powered by alternative energy sources is disclosed. This early alert system comprises: an activity measurement zone (AMZ) defined by an RFID signal projection from an RF antenna operatively connected to an RFID tag reader; an incentive device located near or inside the AMZ to encourage an animal attached with an RFID tag to enter and exit the AMZ periodically or frequently; the RFID tag reader configured to read from or write to the RFID tag attached to the animal if the animal is inside the AMZ defined by the RFID signal projection from the RF antenna; a power source system comprising a wind turbine, a solar panel, a hybrid charge controller, and a rechargeable battery unit, wherein the hybrid charge controller regulates and converts electrical energy received from the wind turbine and the solar panel to compatible voltage and current levels expected by the rechargeable battery unit, and wherein the hybrid charge controller then transmits the regulated and converted electrical energy to the rechargeable battery unit; a portable or fixed main controller unit configured to control, request data from, or send data to one or more elements of the early alert system using a wireless connection, a physical connection, or both; the rechargeable battery unit configured to be charged by the hybrid charge controller, wherein the rechargeable battery unit is also operatively connected to the RFID tag reader, the RFID antenna, and/or other electrical components to provide electrical power to at least some components of the early alert system; a computer server with a CPU and a memory unit operatively connected to the RFID tag reader and the portable or fixed main controller unit to receive information from or transmit information to the RFID tag attached to the animal; and an analytical program module configured to set, adjust, detect, and/or use an alert trigger point for alerting a user that the animal requires personal attention for further medical inspection if an AMZ count for the animal over a period of time drops below the alert trigger point, wherein the analytical program module is executed on the CPU and the memory unit of the computer server, or at least partially executed on another CPU and another memory unit in the portable or fixed main controller unit.

In another embodiment of the invention, a method of alerting a potential livestock disease to a user of an early alert system powered by alternative energy sources is disclosed. This method comprises the steps of: powering at least some components of the early alert system using a wind turbine, a solar panel, a hybrid charge controller, and a rechargeable battery, wherein the rechargeable battery is operatively connected to an RFID tag reader; defining an activity measurement zone (AMZ) enabled by the RFID tag reader and an RF antenna operatively connected to the RFID tag reader; attaching an RFID tag to an animal, wherein the RFID tag reader can read from or write to the RFID tag if the RFID tag is within the AMZ; activating the early alert system for livestock disease detection; monitoring the frequency of the animal's entrance into the AMZ by accessing the RFID tag attached to the animal; and if an alert trigger point is reached, informing the user of the early alert system to encourage further inspection of the animal for a potential health problem or an infection.

BRIEF DESCRIPTION OF DRAWINGS

FIG. 15 shows an example of a report table format for an early alert system for livestock disease detection, in accordance with an embodiment of the invention.

DETAILED DESCRIPTION

Figure 1:
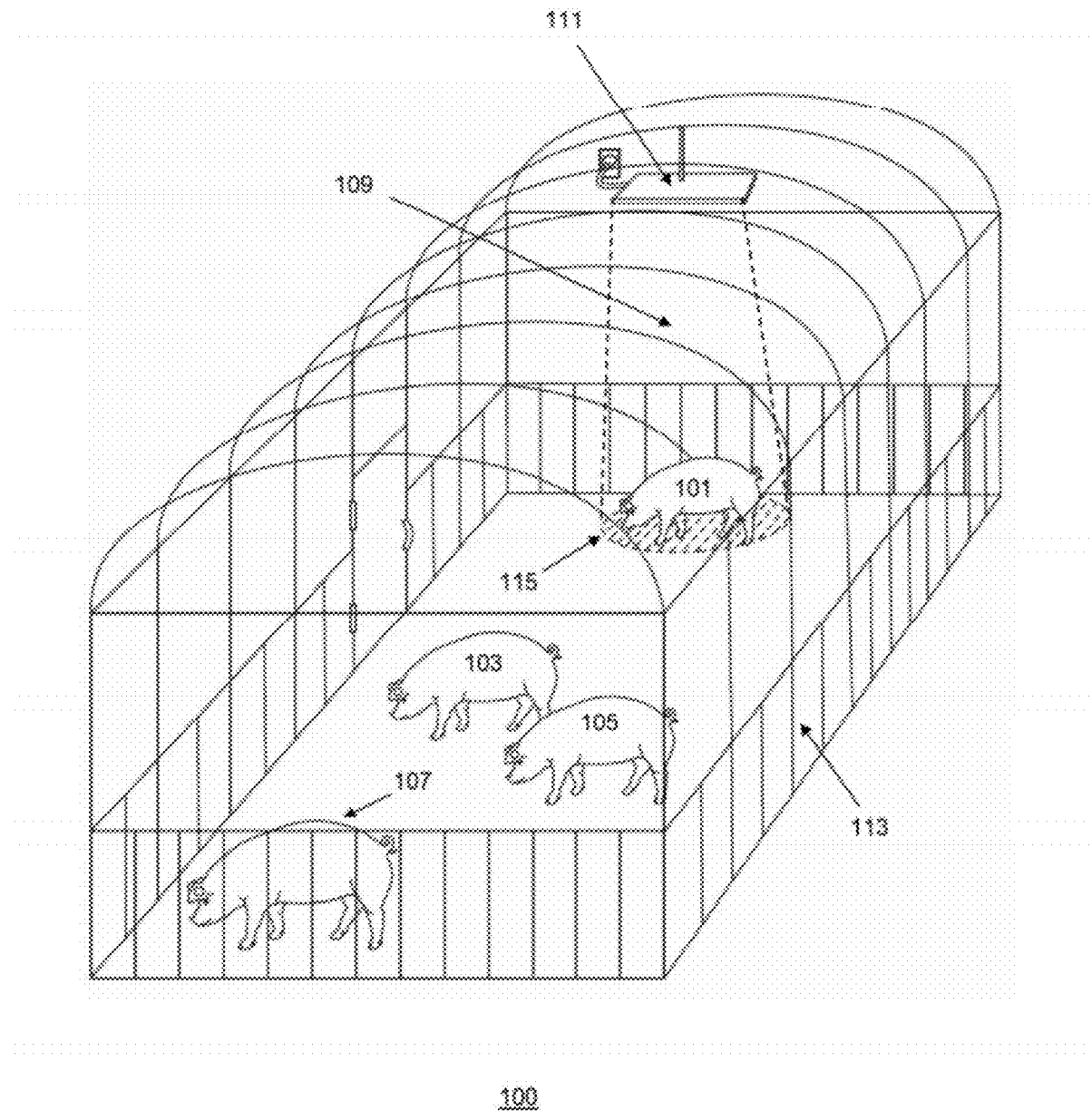
FIG. 1 shows a perspective view of a livestock housing incorporating an early alert system for livestock disease detection, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble an early alert system and a related method for livestock disease detection. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "livestock" is defined as farm animals raised for use and/or profit. The term "livestock" can include, but are not limited to, cattle, sheep, pigs, goats, horses, donkeys, mules, and poultry (e.g. chickens, ducks, turkeys, and geese).

Furthermore, for the purpose of describing the invention, a term "activity measurement zone" (AMZ) is defined as a designated area in which the entrance and/or the exit of a monitored animal into the designated area is counted and tracked by an RFID tag and an RFID reading device. In a preferred embodiment of the invention, the RFID reading device is installed on a ceiling of a livestock housing, and has an RFID tag reading aperture projected to a surface of the livestock housing to comprise an activity measurement zone. The activity measurement zone may be situated inside or near a water feed system, a food dispenser system, or another incentive device which encourages an animal to enter the activity measurement zone frequently or periodically.

Moreover, for the purpose of describing the invention, a term "epidemic" and a term "contagious disease" are defined as an infectious disease for animals and/or humans, wherein the infectious disease may spread by physical contact, air, liquid, or another method of disease transmission.

In addition, for the purpose of describing the invention, a term "radio frequency identification," or RFID, is defined as a wireless signal-based identification of a wirelessly-accessible tag, called an "RFID tag" using a wirelessly-accessible tag reader, called "RFID tag reader." In general, an RFID tag contains information which may be written and/or read by the RFID tag reader, an RF antenna operatively connected to the RFID tag reader, or another tag information access device. In a preferred embodiment of the invention, RFID operates in ultra high frequencies (UHF) to achieve longer read/write ranges (e.g. up to several meters) and multiple tag read/write capabilities, which were difficult to achieve in conventional low frequency (LF)-based RFID devices exhibiting shorter read/write ranges (e.g. approximately up to 30 centimeters) and single tag scan functionalities. In a preferred embodiment of the invention, the UHF range for the RFID tag reader is defined by ISO/IEC 18000-6 air interface standard, which utilizes an operating frequency range of 860 MHz~960 MHz. In another embodiment of the invention, the UHF operating frequency range may be defined more broadly as 300 MHz~3 GHz. In general, the conventional LF operating frequencies are below the UHF RFID tag reader operating frequency ranges.

Furthermore, for the purpose of describing the invention, a term "alternative energy source" is defined as an energy source which enables an electrical device to be at least not entirely dependent on a conventional electrical power line or an electrical outlet for powering the electrical device. In addition, a term "hybrid alternative energy sources" is defined as a plurality of energy sources which enable a powered device to be at least not entirely dependent on a conventional electrical power line or an electrical outlet. For example, a solar panel or a wind turbine may be called an "alternative energy source." A combination of one or more solar panels and wind turbines to power an electrical device may be called "hybrid alternative energy sources."

In addition, for the purpose of describing the invention, a term "hybrid charge controller" is defined as an electrical controller and/or an integrated electrical unit that controls, converts, and/or regulates electrical voltage and currents from one or more alternative energy sources for charging a rechargeable battery unit.

One aspect of an embodiment of the present invention is providing an early alert system for livestock disease detection using RFID technology.

Another aspect of an embodiment of the present invention is providing a method of early detection of livestock disease using RFID technology.

Yet another aspect of an embodiment of the present invention is utilizing a novel concept of an activity measurement zone (AMZ) in conjunction with RFID technology for early detection of livestock disease.

In addition, another aspect of an embodiment of the present invention is providing a motivation, an incentive, or an encouragement for an animal to enter the activity measurement zone (AMZ) frequently or periodically by situating a water feed system, a food dispenser system, or another device near or inside the activity measurement zone.

Furthermore, one aspect of an embodiment of the present invention is providing an early alert system and a related method for livestock disease detection, which are powered by hybrid alternative energy sources.

Another aspect of an embodiment of the present invention is providing an early alert system and a related method of early detection of livestock disease using RFID technology, hybrid alternative energy sources, a portable main controller unit, a network attached storage, a cellular network, and application programs.

FIG. 1 shows a perspective view of a caged livestock housing (100) incorporating an early alert system for livestock disease detection, in accordance with an embodiment of the invention. In a preferred embodiment of the invention, farm animals (e.g. 101, 103, 105, 107) are placed inside the caged livestock housing (100) with a defined or fenced perimeters (113). In the preferred embodiment of the invention, the farm animals (e.g. 101, 103, 105, 107) are depicted as pigs. In another embodiment of the invention, the farm animals may be cattle, sheep, pigs, goats, horses, donkeys, mules, poultry (e.g. chickens, ducks, turkeys, and geese), or another appropriate farm animal.

In the preferred embodiment of the invention, the early alert system for livestock disease detection includes an RFID tag reader with an integrated RF antenna (111) installed on a ceiling of a livestock housing (e.g. 100), an activity measurement zone (AMZ) (115) defined by an aperture, a surface area, or a geometrical shape of the RFID tag reader with the integrated RF antenna (111) and its corresponding RFID signal projection (109). In one embodiment of the invention, the early alert system for livestock disease detection may also include a computer server operatively connected to the RFID tag reader with the integrated RF antenna (111), wherein the computer server processes, stores, monitors, and/or modifies RFID tag-related information. This computer server typically includes a CPU, a memory unit, and a non-volatile information storage unit (e.g. a hard disk, a flash memory-based storage, and etc.), wherein the computer server is also configured to execute an application program (e.g. an analytical program module) on its CPU and memory unit to process, store, monitor and/or, modify the RFID tag-related information for the early alert system.

In another embodiment of the invention, the early alert system for livestock disease detection may also include a discrete RF antenna (e.g. 111), and a separate RFID tag reader operatively connected to the RF antenna, and a computer server operatively connected to the separate RFID tag reader, wherein the computer server processes, stores, monitors, and/or modifies RFID tag-related information. In this embodiment of the invention, this computer server typically includes a CPU, a memory unit, and a non-volatile information storage unit (e.g. a hard disk, a flash memory-based storage, and etc.), wherein the computer server is also configured to execute an application program on its CPU and memory unit to process, store, monitor, and/or modify the RFID tag-related information for the early alert system.

In one or more embodiments of the invention, it may be desirable to use a discrete RF antenna operatively connected to a separate RFID tag reader, instead of using the integrated RF antenna in the RFID tag reader to define the activity measurement zone (AMZ) (e.g. 115). In one embodiment of the invention, the AMZ (115) may be defined on a floor of a livestock housing. In another embodiment of the invention, the AMZ (115) may be defined on another surface other than the floor.

In a preferred embodiment of the invention, the RFID tag reader with the integrated or discrete RF antenna (111) enables communication with one or more RFID tags. In another embodiment of the invention, an RFID tag reader may be operatively connected to a discrete RF antenna (e.g. 111) which enables communication with one or more RFID tags. Yet in another embodiment of the invention, an RFID tag reader may be operatively connected to a plurality of discrete RF antennas. Furthermore, in one embodiment of the invention, the RFID tag reader with the integrated or discrete RF antenna (111) may be a fixed unit attached in the vicinity of the livestock housing (100). In another embodiment of the invention, a discrete RF antenna (e.g. 111) is a fixed unit attached in the vicinity of the livestock housing (100), wherein the discrete RF antenna is operatively connected to a separate RFID tag reader. Yet in another embodiment of the invention, an RFID tag reader may be a portable unit with an integrated RF antenna.

Furthermore, in one example, the activity measurement zone (AMZ) is a circular area (i.e. 115) defined by a projected diameter of the RFID signal projection (109) from the RFID tag reader with the integrated or discrete RF antenna (111). In another example, the AMZ may be an ellipse, a square, a polygonal, or any other shapes also defined by projected length and/or height of the RFID signal projection (109). In the preferred embodiment of the invention, the RFID signal projection (109) is invisible to a naked human eye as any radio frequency wave is invisible to humans, and the corresponding AMZ (115) is also invisible to the naked human eye. However, visual markers such as painted borders or elevated objects may be used to help farmers visualize where the AMZ (115) is located per livestock housing.

Figures 6, 7A, 7B:
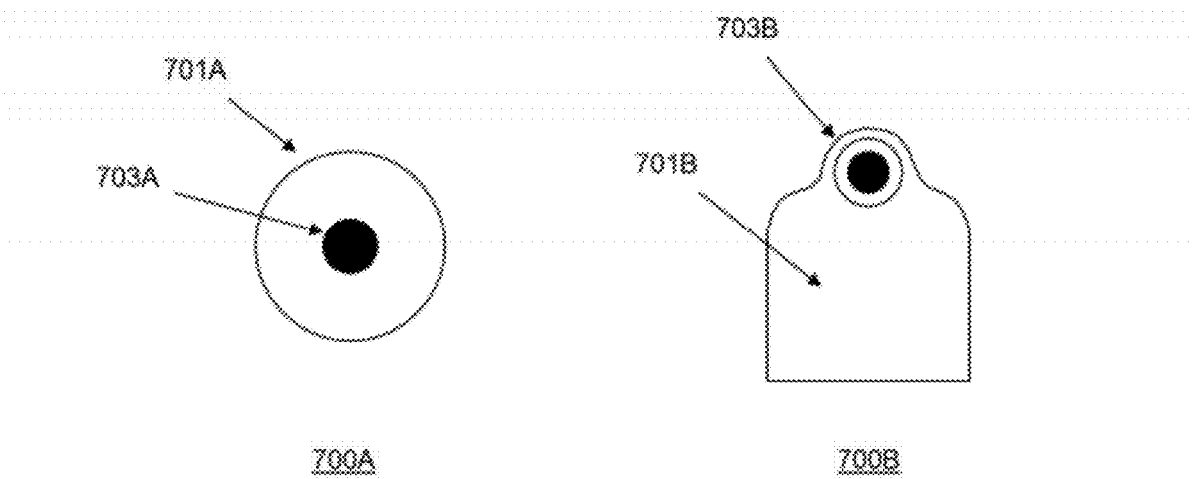
FIG. 6 shows an example of information stored in an RFID tag attachable to an animal, in accordance with an embodiment of the invention.
FIG. 7A shows an example of an RFID tag attachable to an animal, in accordance with an embodiment of the invention.
FIG. 7B shows another example of an RFID tag attachable to an animal, in accordance with an embodiment of the invention.

Continuing with FIG. 1, in the preferred embodiment of the invention, the RFID tag reader with the integrated or discrete RF antenna (111) is powered by an AC electric outlet. In one or more embodiments of the invention, the RFID tag reader with the integrated or discrete RF antenna (111) may be powered by a battery or a source of alternative energy, such as a solar panel or a wind turbine. In the preferred embodiment of the invention, the RFID tag reader with the integrated or discrete RF antenna (111) is capable of reading information from an RFID tag attached to a farm animal (e.g. 101) when the farm animal (e.g. 101) enters the activity measurement zone (AMZ) (115). The RFID tag reader with the integrated or discrete RF antenna (111) may also be capable of writing information to the RFID tag attached to the farm animal (e.g. 101) when the farm animal (e.g. 101) enters the AMZ (115). An example of information read from or written to a particular RFID tag attached to a particular farm animal may include, but are not limited to, a tag ID, an animal type, date of birth, gender, owner, vaccine records, AMZ count, location information (i.e. based on GPS coordinates, cellular base station identification number, and etc.), and/or other information as illustrated by FIG. 6, which shows an example of information stored in an RFID tag attached to a farm animal. Alternatively, at least some of these information (e.g. a tag ID, an animal type, date of birth, gender, owner, vaccine records, AMZ count, location information (i.e. based on GPS coordinates, cellular base station identification number, and etc.), and/or other information) may be tracked and stored in a computer server in addition to or instead of being stored in an RFID tag.

In the preferred embodiment of the invention, the RFID tag reader with the integrated or discrete RF antenna (111) and RFID tags attachable to farm animals are designed to operate in UHF frequencies, which enable longer-range access (e.g. up to several meters) between an integrated RF antenna or a discrete RF antenna and RFID tags than the conventional low frequency (LF)-based RFID solutions, which can typically access the tags in less than 30 centimeters. Furthermore, the RFID tag reader (111) and corresponding RFID tags, which are designed to operate in UHF frequencies, can handle simultaneous multiple RFID tag reads and writes, thereby enabling the implementation of the AMZ (115) for tracking simultaneous entry and exit of a multiple number of farm animals (e.g. 101, 103, 105, 107) in accordance with an embodiment of the invention.

In one or more embodiments of the invention, the activity measurement zone (AMZ) (e.g. 115) is a designated area in which the entrance and/or the exit of a monitored animal into the designated area is counted and tracked by an RFID tag and an RFID reading device (e.g. 111). In a preferred embodiment of the invention, the RFID reading device (e.g. 111) with an integrated RF antenna, or a discrete RF antenna operatively connected to an RFID reading device is installed on a ceiling of a livestock housing (e.g. 100), and has an RFID tag reading aperture projected (e.g. 109) to a surface of the livestock housing to formulate an activity measurement zone (AMZ) (e.g. 115). The activity measurement zone (AMZ) (e.g. 115) may be situated inside or near a water feed system, a food dispenser system, or another incentive device which encourages an animal to enter the activity measurement zone frequently or periodically.

Figure 2:
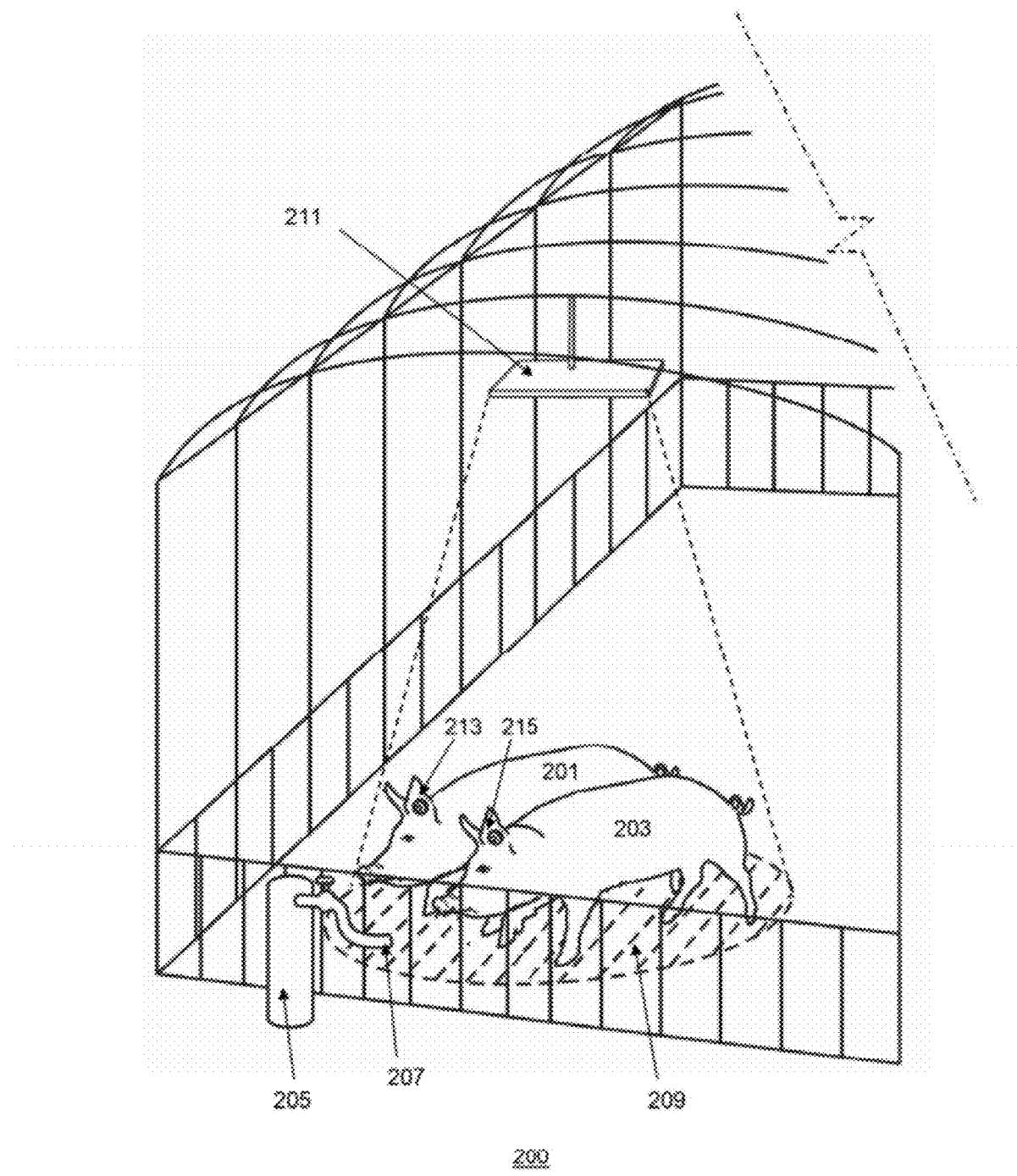
FIG. 2 shows a partial perspective view of a livestock housing incorporating an early alert system for livestock disease detection, in accordance with an embodiment of the invention.

FIG. 2 shows a partial perspective view of a livestock housing (200) incorporating an early alert system for livestock disease detection, in accordance with an embodiment of the invention. In a preferred embodiment of the invention, the early alert system for livestock disease detection can track and count entry and exit of each farm animal (e.g. 201, 203) entering and exiting an activity measurement zone (AMZ) (e.g. 209) by reading and/or writing each RFID tag (e.g. 213, 215) attached to each farm animal (e.g. 201, 203) in the livestock housing with an RFID tag reader with the integrated or discrete RF antenna (e.g. 211) installed inside or near the livestock housing. In one embodiment of the invention, the early alert system for livestock disease detection may include an RF antenna integrated into an RFID tag reader or a discrete RF antenna operatively connected to an RFID tag reader. In addition, the early alert system for livestock disease detection may also include a computer server or another wireless tag information processing device for processing, storing, monitoring, and/or modifying RFID tag information.

In a preferred embodiment of the invention, the RFID tag reader has an integrated RF antenna (211) for enabling communication with one or more RFID tags. In another embodiment of the invention, an RFID tag reader may be operatively connected to a discrete RF antenna (e.g. 211) which enables communication with one or more RFID tags. Yet in another embodiment of the invention, an RFID tag reader may be operatively connected to a plurality of discrete RF antennas, wherein the plurality of discrete RF antennas defines an activity measurement zone (AMZ) (e.g. 209) to access one or more RFID tags entering and/or exiting the AMZ. Furthermore, in one embodiment of the invention, the RFID tag reader may be a fixed unit with an integrated RF antenna (211), or a separate RFID tag reader unit operatively connected to a discrete RF antenna (e.g. 211). In another embodiment of the invention, an RFID tag reader may be a portable unit with an integrated RF antenna.

In one or more embodiments of the invention, it may be desirable to also install an incentive device (e.g. 207) inside or near the AMZ (e.g. 209), because the incentive device (e.g. 207) motivates a farm animal to enter the AMZ (e.g. 209) frequently or periodically.

Farm animals which are anemic and/or less active over a particular period of time may indicate that they are getting sick and/or require medical attention. A novel aspect of the early alert system and method for livestock disease detection is related to farm animals' general tendency to become more inactive if they are getting sick. Therefore, an animal's sudden or gradual drop in its activity level near an incentive (e.g. food, water, and etc.) can be a good indication of its deteriorating health. By utilizing an RFID tag reader and an RF antenna (e.g. 211) capable of simultaneous multiple RFID tag (e.g. 213, 215) accesses on farm animals (e.g. 201, 203) in a defined area (e.g. AMZ (209) of FIG. 2, AMZ (115) of FIG. 1, and etc.) with an incentive device (e.g. 207) inside or nearby, one or more embodiments of the present invention disclose unique and novel systems and methods which enable an early and proactive detection of a farm animal's onset of disease or sickness.

One or more embodiments of the present invention may be particularly useful for alerting a farmer for a potentially-infectious disease in a particular farm animal attached with an RFID tag, based on its reduced activity levels to the activity measurement zone (AMZ) (e.g. 209). The early alert system and method may alert the farmer by a periodic communication method such as a periodic email report (i.e. hourly, daily, weekly, and etc.) or by dynamic event triggers. In dynamic event trigger instances, an e-mail, a telephone call, a text message, a display terminal alert, or any other desirable dynamically-triggered alert methods may be triggered by an alarming event, such as reaching an alert trigger point for a particular animal attached with an RFID tag.

In the particular example illustrated in FIG. 2, farm animals are depicted as pigs (201, 203), each of which has an RFID tag (213, 215) attached to its ear. Furthermore, the incentive device (207) held up by an incentive device stand (205) is situated near or inside the activity measurement zone (AMZ) (209). In a preferred embodiment of the invention, the incentive device (207) may be a water feed system or a food dispenser system. In another embodiment of the invention, the incentive device (207) may be another incentive apparatus which motivates the farm animals to enter the AMZ (209) frequently or periodically.

Continuing with FIG. 2, in the preferred embodiment of the invention, the RFID tag reader with the integrated or discrete RF antenna (211) is capable of reading information from an RFID tag (213, 215) attached to a farm animal (201, 203) when the farm animal (e.g. 101) enters the activity measurement zone (AMZ) (115). Furthermore, the RFID tag reader with the integrated or discrete RF antenna (211) may also be capable of writing information to the RFID tag attached to the farm animal (201, 203) when the farm animal (201, 203) enters the AMZ (209). An example of information read from or written to a particular RFID tag attached to a particular farm animal may include, but are not limited to, a tag ID, an animal type, date of birth, gender, owner, vaccine records, AMZ count, location information (i.e. based on GPS coordinates, cellular base station identification number, and etc.), and/or other information as illustrated by FIG. 6, which shows an example of information stored in an RFID tag attached to a farm animal. Alternatively, at least some of these information (e.g. a tag ID, an animal type, date of birth, gender, owner, vaccine records, AMZ count, location information (i.e. based on GPS coordinates, cellular base station identification number, and etc.), and/or other information) may be tracked and stored in a computer server in addition to or instead of being stored in an RFID tag.

In the preferred embodiment of the invention, the RFID tag reader with the integrated, or discrete RF antenna (211) and RFID tags attachable to farm animals are designed to operate in UHF frequencies, which enable longer-range access (e.g. up to several meters) between the RFID tag reader with the integrated or discrete RF antenna (211) and RFID tags than the conventional low frequency (LF)-based RFID solutions, which can typically access the tags in less than 30 centimeters. Furthermore, the RFID tag reader with the integrated or discrete RF antenna (211) and corresponding RFID tags (213, 215), which are designed to operate in UHF frequencies, can handle simultaneous multiple RFID tag reads and writes, thereby enabling the implementation of the AMZ (209) for tracking simultaneous entry and exit of a multiple number of farm animals (201, 203) in accordance with an embodiment of the invention.

Figure 3:
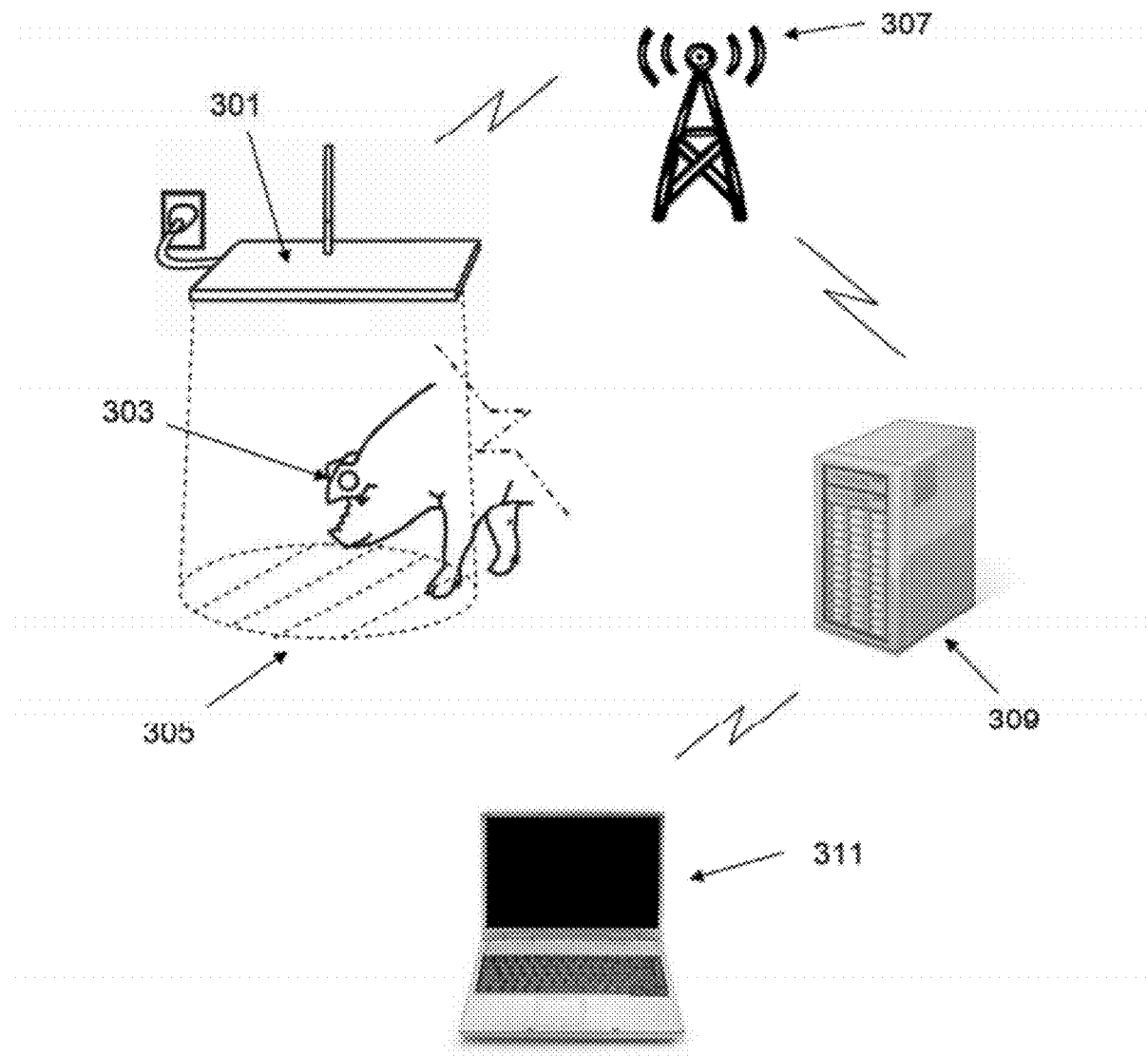
FIG. 3 shows a system diagram for an early alert system for livestock disease detection, in accordance with an embodiment of the invention.

FIG. 3 shows a system diagram for an early alert system (300) for livestock disease detection, in accordance with an embodiment of the invention. In a preferred embodiment of the invention, the early alert system (300) for livestock disease detection comprises an RFID tag reader with the integrated or discrete RF antenna (301), an activity measurement zone (AMZ) (305), an RFID tag (303) operatively attached to an animal, a wireless transceiver (307) (e.g. a WiFi transceiver, a cellular base station, another wireless protocol transceiver, or a combination thereof) operatively connected to the RFID tag reader with the integrated or discrete RF antenna (301), and a computer server (309) configured to process, display, and/or store RFID tag-related information, wherein the computer server (309) also contains an analytical program module to set, adjust, detect, and/or use an alert trigger point for alerting a user that the animal requires personal attention for further inspection and determination of its health.

The early alert system (300) may also further comprise a user display terminal (311) configured to display useful information to the user (e.g. farmer). Furthermore, the early alert system (300) may also utilize an email alert, a telephone call, and/or a text message to alert the farmer that the alert trigger point is reached for a potential livestock disease on the animal with the RFID tag (303).

In the preferred embodiment of the invention, the alert trigger point is reached if the animal's activity measurement zone (AMZ) entry count drops dramatically over a period of time, and/or is less than what is considered a healthy amount of activity to the AMZ. Furthermore, in the preferred embodiment of the invention, the analytical program module is an application software program, which receives information (e.g. one or more items in FIG. 6) from the RFID tag (303) or transmits information (e.g. one or more items in FIG. 6) to the RFID tag (303). This software program may be configured to be executed on a CPU and a memory unit of the computer server (309).

In one or more embodiments of the invention, the communication among the RFID tag reader with the integrated or discrete RF antenna (e.g. 301), the computer server (309), and the user display terminal (311) may be implemented using at least some wired connections for device communications, instead of only utilizing wireless communications. Therefore, one or more embodiments of the invention may not require the wireless transceiver (e.g. 307), if the communication points between the RFID tag reader with the integrated or discrete RF antenna (e.g. 301) and the computer server (e.g. 309) are based on wired lines.

Furthermore, in one or more embodiments of the invention, the user display terminal (e.g. 311) may be a desktop or a laptop computer, which may also optionally integrate the functionality of a separate computer server (e.g. 309), thereby making the separate computer server (e.g. 309) unnecessary in their respective implementations. In addition, in one or more embodiments of the invention, a discrete RF antenna may be operatively connected to the RFID tag reader to read from or write to the RFID tag (e.g. 303). Yet in another embodiment of the invention, an RF antenna which can read from or write to the RFID tag (e.g. 303) may be operatively connected to the computer server (e.g. 309) and/or the user display terminal (e.g. 311), wherein the computer server (e.g. 309) and/or the user display terminal (e.g. 311) integrate the functionality of an RFID tag reader.

Continuing with FIG. 3, in one or more embodiments of the invention, it may be desirable to also install an incentive device (e.g. 207 of FIG. 2) inside or near the AMZ (e.g. 305), because the incentive device (e.g. 207 of FIG. 2) motivates a farm animal to enter the AMZ (e.g. 305) frequently or periodically. Farm animals which are anemic and/or less active over a particular period of time may indicate that they are getting sick and/or require medical attention. A novel aspect of the early alert system and method for livestock disease detection is related to farm animals' general tendency to become more inactive if they are getting sick. Therefore, an animal's sudden or gradual drop in its activity level near an incentive (e.g. food, water, and etc.) can be a good indication of its deteriorating health. By utilizing an RFID tag reader with the integrated or discrete RF antenna (e.g. 301) capable of simultaneous multiple RFID tag (e.g. 303, and etc.) accesses on farm animals in a defined area (e.g. AMZ (305)) with an incentive device (e.g. 207 of FIG. 2) inside or nearby, one or more embodiments of the present invention disclose unique and novel systems and methods, which enable an early and proactive detection of a farm animal's onset of disease or sickness. One or more embodiments of the present invention may be particularly useful for alerting a farmer for a potentially-infectious disease on a particular farm animal attached with an RFID tag (e.g. 303) based on its reduced activity levels to the activity measurement zone (AMZ) (e.g. 305).

Figure 4:
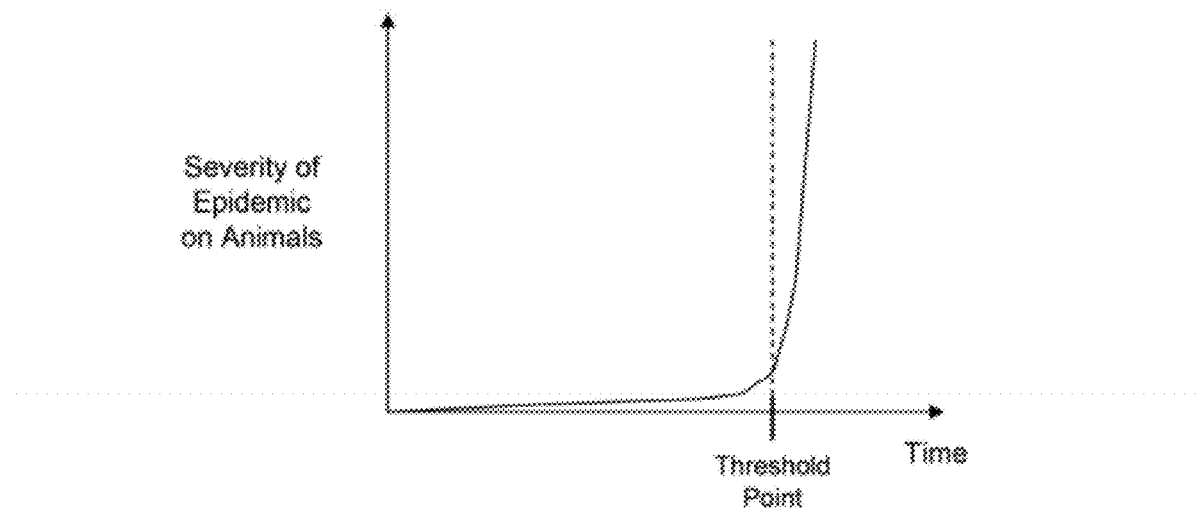
FIG. 4 shows an example of characteristics of an epidemic among animals in a livestock housing.

The importance of early detection of an infectious livestock disease is illustrated in FIG. 4. FIG. 4 shows an example (400) of characteristics of an epidemic among animals in a livestock housing, in accordance with an embodiment of the invention. In this example, the severity of epidemic on animals is graphed against time after the start of an infection on a first infected animal. The epidemic starts with a single infected animal, but begins to spread exponentially as the number of infected animals multiplies in the livestock housing. A "threshold point" relative to the progression of time is shown to illustrate that there comes a point of "no return," or a starting point for a very difficult epidemic containment in the livestock housing, if the epidemic is accidentally left unnoticed and/or untreated.

Therefore, the novel early alert system and method for livestock disease detection as shown in various embodiments of the present invention may become a very helpful tool for farmers to detect, control, and treat any outbreak of infectious diseases earlier and more accurately than manual inspection of the farm animals. The novel early alert system and method for livestock disease detection may be especially useful in containing potential damages and preventing further outbreak of an infectious disease, if an early alert for a potential outbreak of the infectious disease is given to a farmer well before the threshold point of "no return," as shown in FIG. 4.

Figure 5:
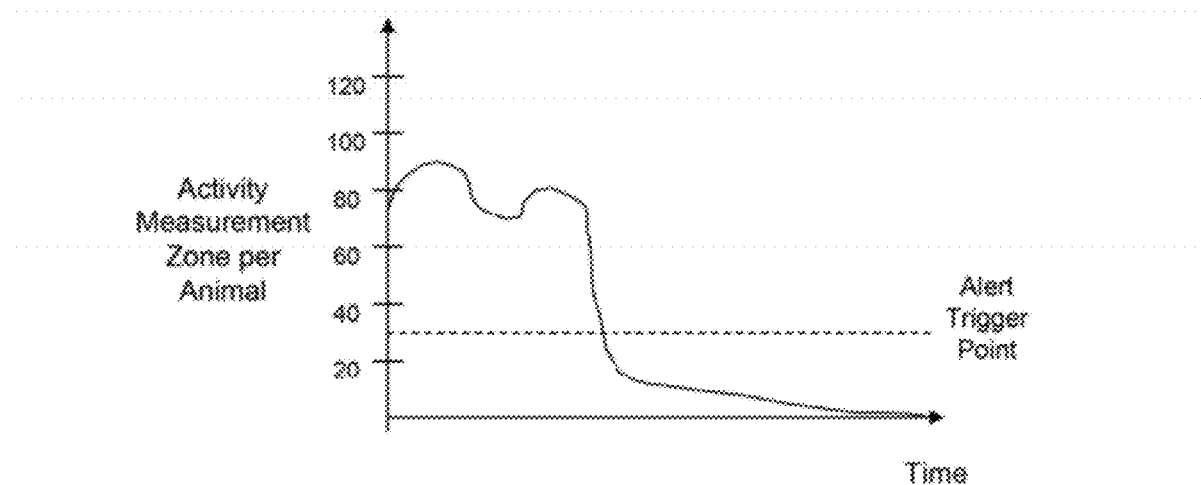
FIG. 5 shows an example of an alert trigger point for livestock disease detection, in accordance with an embodiment of the invention.

FIG. 5 shows an example (500) of an alert trigger point for livestock disease detection in accordance with an embodiment of the invention. This example shows an activity measurement zone per animal plotted against a progression of time, as shown by the graph. In this particular example, an animal with an RFID tag is tracked for its entry and exit into an activity measurement zone (AMZ) over a period of one week. For the first few days, the animal showed a normal level of activity in and out of the AMZ (e.g. 70~90 entries into the AMZ). Then, the animal's activity level in and out of the AMZ suddenly drops to an alarming level, which is exemplified by crossing of the "alert trigger point" when the animal's activity into the AMZ falls below 30 entries per day.

In a preferred embodiment of the invention, the early alert system and method for livestock disease detection keeps track of activity levels of each animal with an RFID tag, and an animal with an AMZ-related activity level falling below the alert trigger point is flagged as a potential health problem worthy of a farmer's attention. It should be noted that reaching the alert trigger point does not necessarily mean that the animal in question is sick. For example, the alert trigger point may be reached as a result of an equipment-related false alarm, or unusual circumstances without any outbreak of a disease. However, a sudden or unusual drop in an animal's AMZ-related activity level strongly indicates that a health problem likely caused the animal's reduced activity levels, and a system-level alert for a closer personal inspection of the animal in question is justified for proactive prevention, detection, and management of livestock diseases.

In the preferred embodiment of the invention, the tracking of activity levels of each animal with an RFID tag is coordinated and managed by an analytical program module, which is configured to set, adjust, detect, and/or use an alert trigger point for alerting a user that a particular animal requires personal attention for further inspection and determination of its health.

In one exemplary use of the analytical program module, the analytical program may use statistical methods to calculate and determine what is a good alert trigger point. In another exemplary use of the analytical program module, the analytical program may allow a user (e.g. a farmer) to manually choose an alert trigger point based on a cutoff value for activity levels per day, week, or another defined period of time. In one or more embodiments of the invention, the analytical program module may reside in a computer server (e.g. 309 of FIG. 3), a desktop computer, and/or a laptop computer.

If the alert trigger point is reached for a particular animal, as shown in FIG. 5, the early alert system may alert the user via a user display terminal (e.g. 311 of FIG. 3). Furthermore, the early alert system may also utilize an email alert, a telephone call, and/or a text message to alert the user proactively that the alert trigger point is reached for further personal attention to the particular animal. For example, in one embodiment of the invention, the early alert system may generate the email alert first, and then also proceed to the telephone call-based alert if necessary.

FIG. 6 shows an example of information (600) stored in a computer server, another data storage, and/or an RFID tag attachable to an animal, in accordance with an embodiment of the invention. In a preferred embodiment of the invention, an RFID tag attachable to a particular animal stores a unique tag identification code (601) designed to identify the particular animal among a plurality of animals. The unique tag identification code (601) for the particular animal is also typically associated with other pieces of information, such as a type/grade of the animal (603), date of birth (605), gender (607), owner (609), and vaccine records (611) for the particular animal. In addition, the RFID tag, a computer server, and an analytical program module executed on the computer server may also keep records of castration because the completion of castration may impact a particular animal's behavior.

Furthermore, in one or more embodiments of the invention, an activity measurement zone (AMZ) count (613) is also tracked, updated, and associated with the particular animal identified by the unique tag identification code (601). In one embodiment of the invention, tracking and updating the AMZ count (613) may be a task of an analytical program module, which is also responsible for setting, adjusting, detecting, and/or using an alert trigger point for alerting a user that the particular animal requires personal attention for further inspection and determination of its health. In another embodiment of the invention, tracking and updating the AMZ count (613) may be a task of another software and/or hardware module which communicates with the analytical program module. In one or more embodiments of the invention, the AMZ count (613) may be incremented by one for each entry of the particular animal into the AMZ. In addition, the AMZ count (613) may be periodically reset to an initialization value on a daily, weekly, or another period-defined basis, depending on a particular embodiment of the invention. In the preferred embodiment of the invention, if the AMZ count (613) within a particular period (e.g. daily, weekly, and etc.) for a particular animal (e.g. A00001) falls below the alert trigger point, then the user is alerted via a user display terminal, a phone call, an email alert, and/or a text message.

Continuing with FIG. 6, information (600) stored in an RFID tag attachable to an animal may also include other information (615) not shown in FIG. 6, such as location information associated with the RFID tag (i.e. based on GPS coordinates, cellular base station identification number, and etc.). In a preferred embodiment of the invention, the RFID tag per animal may be initialized with a fixed set of information, such as a unique tag identification code (601), a type/grade of the animal (603), date of birth (605), gender (607), and owner (609), while other pieces of information such as vaccine records (611) and AMZ counts (613) may be periodically or continuously updated throughout the lifetime of a particular animal. Furthermore, some or all pieces of information (600) can be read from or written to the RFID tag periodically or continuously throughout the lifetime of the particular animal for use by the analytical program module and/or other relevant modules, devices, and apparatuses to enable the early alert system for livestock disease detection.

An example of information read from or written to a particular RFID tag attached to a particular farm animal may include, but are not limited to, a tag ID (601), an animal type (603), date of birth (605), gender (607), owner (609), vaccine records (611), AMZ count (613), and/or other information (615), as illustrated by FIG. 6, which shows an example of information associated with an RFID tag attached to a farm animal. Alternatively, at least some of these information (e.g. a tag ID (601), an animal type (603), date of birth (605), gender (607), owner (609), vaccine records (611), AMZ count (613), and/or other information (615)) may be tracked and stored in a computer server in addition to or instead of being stored in an RFID tag.

FIG. 7A shows an example of a circular RFID tag (700A) attachable to an animal in accordance with an embodiment of the invention. The circular RFID tag (700A) is typically used for a smaller animal such as a pig. In a preferred embodiment of the invention, the circular RFID tag (700A) is a battery-less (i.e. without a battery) "passive" tag, which comprises a non-volatile memory unit and an RF antenna encapsulated by a weather-resistant covering (701A). In the preferred embodiment of the invention, the circular RFID tag (700A) has a diameter of 3.5 centimeters. The RF antenna in the circular RFID tag (700A) is configured to receive an electromagnetic signal from an RFID tag reader to energize the non-volatile memory unit inside the circular RFID tag (700A) to transmit information from or send information to the non-volatile memory unit. In another embodiment of the invention, the circular RFID tag (700A) may be a battery-powered "active" tag.

In the preferred embodiment of the invention, the circular RFID tag (700A) also has an attachment pin mechanism (703A) to enable a secure attachment of the circular RFID tag (700A) to an ear or another body part of an animal. Furthermore, the weather-resistant covering (701A) is generally made of sturdy plastic, rubber, and/or other synthetic materials which are non-poisonous for use with edible livestock.

FIG. 7B shows an example of a rectangular RFID tag (700B) attachable to an animal in accordance with an embodiment of the invention. The rectangular RFID tag (700B) can be used in a variety of animals, but most notably, cattle. In a preferred embodiment of the invention, the rectangular RFID tag (700B) is a battery-less "passive" tag, which comprises a non-volatile memory unit and an RF antenna encapsulated by a weather-resistant covering (701B). The RF antenna in the rectangular RFID tag (700B) is configured to receive an electromagnetic signal from an RFID tag reader to energize the non-volatile memory unit inside the rectangular RFID tag (700B) to transmit information from or send information to the non-volatile memory unit. In another embodiment of the invention, the rectangular RFID tag (700B) may be a battery-powered "active" tag.

In the preferred embodiment of the invention, the rectangular RFID tag (700B) also has an attachment pin mechanism (703B) to enable a secure attachment of the rectangular RFID tag (700B) to an ear or another body part of an animal. Furthermore, the weather-resistant covering (701B) is generally made of sturdy plastic, rubber, and/or other synthetic materials which are non-poisonous for use with edible livestock.

Figure 8:
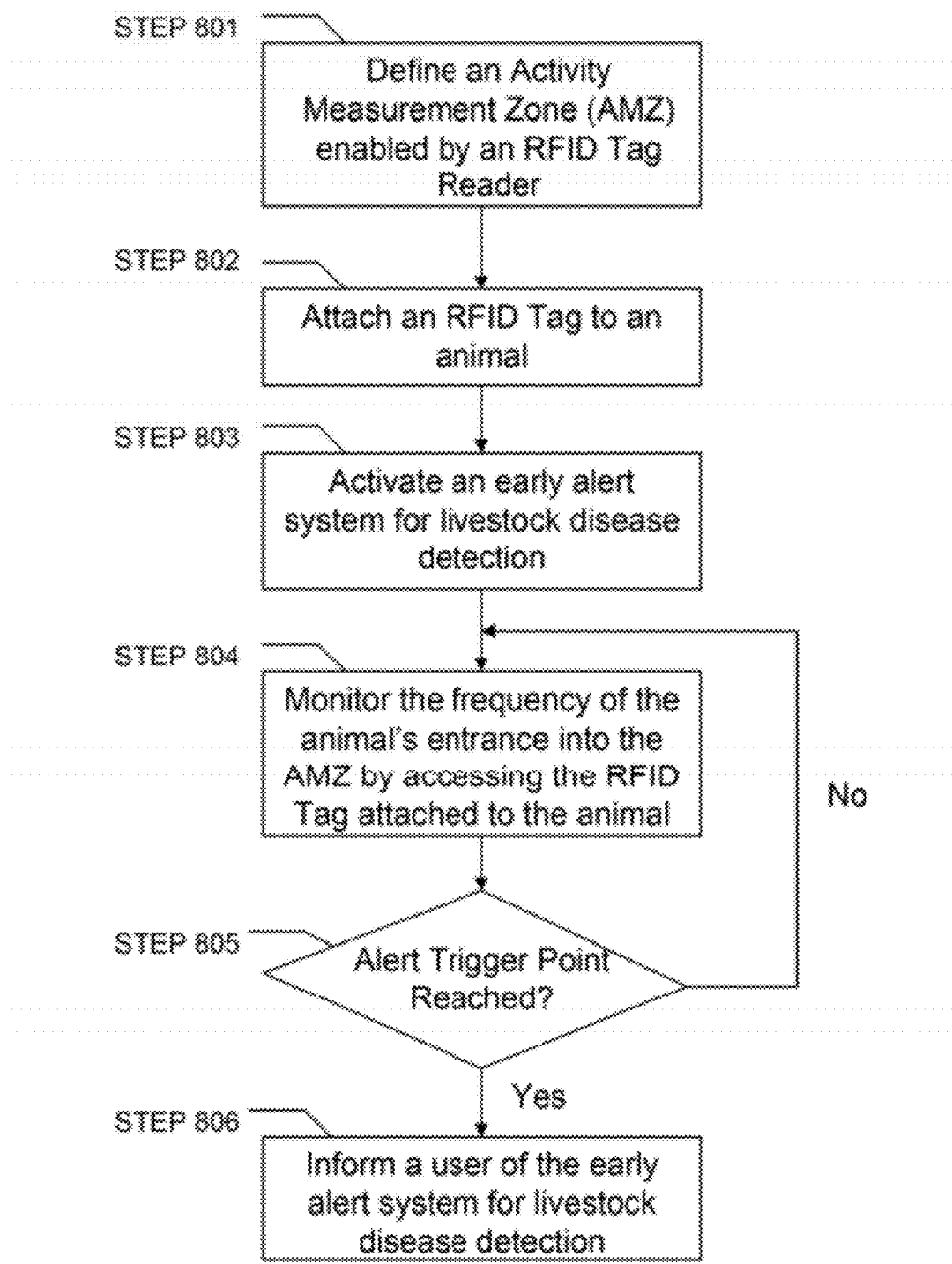
FIG. 8 shows a method of using an early alert system for livestock disease detection, in accordance with an embodiment of the invention.

FIG. 8 shows a method (800) of using an early alert system for livestock disease detection in accordance with an embodiment of the invention. In a preferred embodiment of the invention, a user (e.g. a farmer) can define an activity measurement zone (AMZ) enabled by an RFID tag reader and/or an RF antenna, as shown in STEP 801. Then, the user may attach an RFID tag to an animal, as shown in STEP 802. In one example, the RFID tag may be attached to an ear of the animal. In another example, the RFID tag may be attached to another body part of the animal. In most cases, data initialization of the RFID tag may be necessary prior to or during the attachment of the RFID tag to the animal. Then, the user can activate an early alert system for livestock disease detection, as shown in STEP 803. In a preferred embodiment of the invention, the early alert system for livestock disease detection may resemble a system architecture shown in FIG. 3. In another embodiment of the invention, the early alert system for livestock disease detection may incorporate at least partially wireline-based connections and/or other devices.

The early alert system for livestock disease detection, once activated, begins to monitor the frequency of the animal's entrance into the activity measurement zone (AMZ) by accessing the RFID tag attached to the animal, as shown in STEP 804. In one embodiment of the invention, the early alert system tracks and counts the number of entrances to the AMZ per animal over a defined period of time by recognizing a unique tag identification code (e.g. 601) per each animal. The early alert system may store relevant data in a computer or a computer server. Furthermore, the RFID tag attached to the animal may also optionally store an AMZ entrance count, as previously shown by an AMZ count field (e.g. 613 in FIG. 6), if the RFID tag reader is configured to conduct a data field update function to store the AMZ entrance count for the RFID tag.

Continuing with FIG. 8, if an alert trigger point is reached because the AMZ count for a particular animal drops below the alert trigger point for a defined period of time, then the early alert system for livestock disease detection informs the user that personal attention is necessary to inspect the particular animal in question to determine its potential health problems, as shown in STEP 806. On the other hand, if the alert trigger point is not reached during the monitoring phase of the animal's entrance into the AMZ, then the early alert system continues to monitor the frequency of the animal's entrance into the AMZ by accessing the RFID tag attached to the animal, as shown in STEPs 804 and 805.

Figure 9:
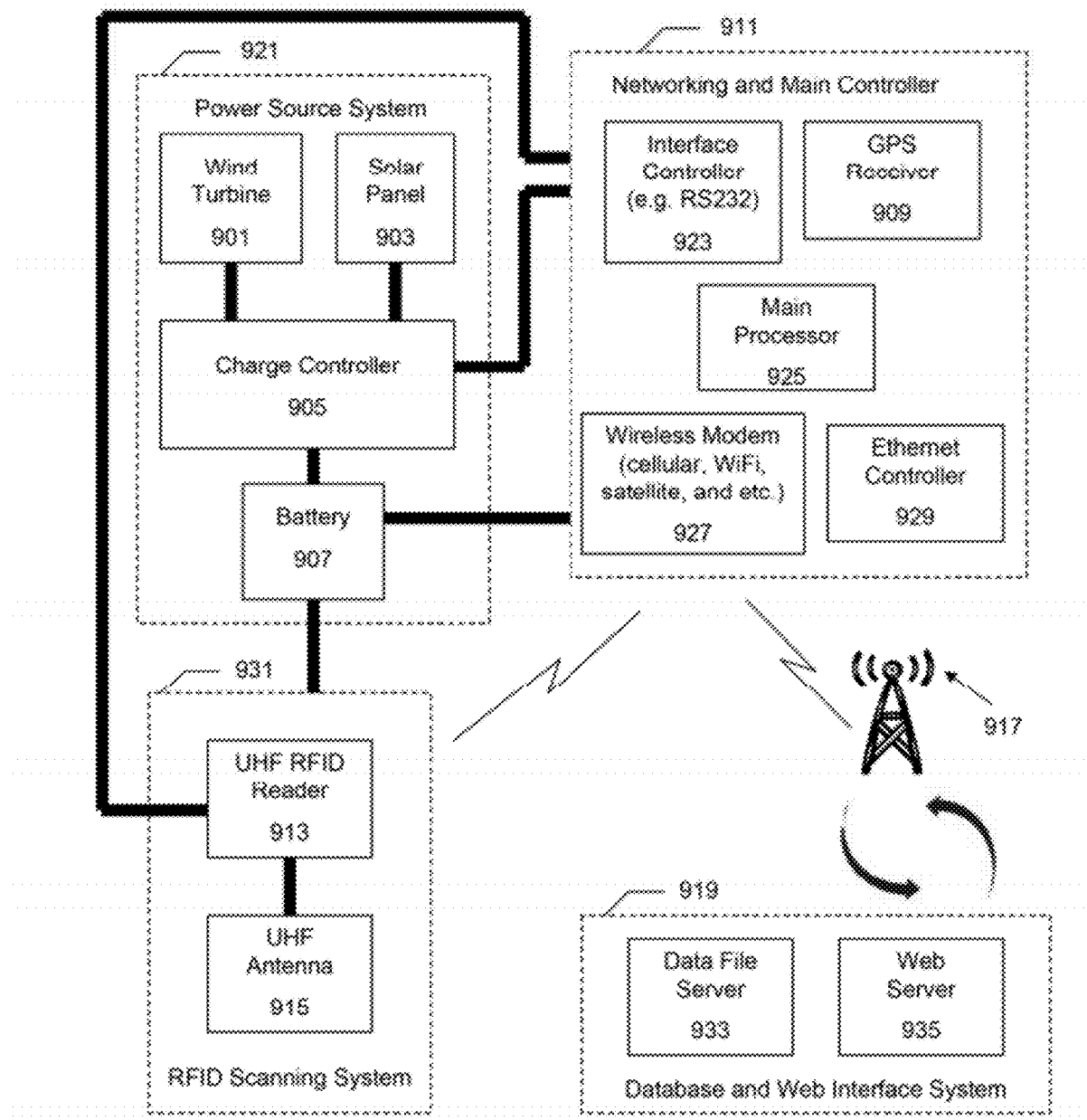
FIG. 9 shows a system diagram for an early alert system for livestock disease detection powered by alternative energy sources, in accordance with an embodiment of the invention.

FIG. 9 shows a system diagram (900) for an early alert system for livestock disease detection powered by alternative energy sources, in accordance with an embodiment of the invention. By powering the early alert system with alternative energy sources, this embodiment of the invention enables convenient installation of the early alert system for livestock disease detection in remote or rural areas (e.g. a remotely-located rural livestock farm), where access to conventional electrical power lines and outlets may be difficult, costly, or inconvenient. Furthermore, by utilizing alternative energy sources, this embodiment of the present invention is also environmentally-friendly and energy efficient. It may be desirable to keep most of the component casings for the early alert system for livestock disease detection to be weather-proof and water-resistant in one or more embodiments of the invention, because at least a substantial portion of the early alert system may be installed in an outdoor environment.

In a preferred embodiment of the invention, the early alert system for livestock disease detection powered by alternative energy sources comprises a power source system (921), a networking and main controller system (911), an RFID scanning system (931), a cellular or satellite communication network (917), and a database and web interface system (919). In the preferred embodiment of the invention, the power source system (921) further comprises a wind turbine (901) and a solar panel (903) which are operatively connected to a hybrid charge controller (905). The wind turbine (901) and the solar panel (903) are alternative energy sources that provide electrical currents and voltages to the hybrid charge controller (905), which in turn converts, regulates, and controls the incoming electrical currents and voltages from the alternative energy sources for charging a rechargeable battery unit (907).

In the preferred embodiment of the invention, the wind turbine (901) provides an alternate current (AC) and intermittent electrical energy to the hybrid charge controller (905), while the solar panel (903) provides a direct current (DC) and intermittent electrical energy to the hybrid charge controller (905). In one embodiment of the invention, an important function of the hybrid charge controller (905) is converting, regulating, and controlling these incoming electrical currents and voltages into an optimized form of electrical energy for charging the rechargeable battery unit (907). In one embodiment of the invention, the hybrid charge controller (905) converts any incoming alternate current (AC) into direct current (DC) and also converts voltage levels to be compatible to that of the rechargeable battery unit (907). The hybrid charge controller (905) also protects the power source system (921) and the rechargeable battery unit (907) from dangerous or undesirable voltage and current surges, which may occur while receiving electrical energy from the alternative energy sources (e.g. 901, 903). In one example of an embodiment of the invention, the rechargeable battery unit (907) operates at 12 VDC with a maximum operating current of 200 amps. In one embodiment of the invention, the wind turbine (901) has a maximum power generation capacity of 400 Watts, and the solar panel (903) has a maximum power generation capacity of 60 Watts.

Continuing with FIG. 9, in the preferred embodiment of the invention, the rechargeable battery unit (907) powers the RFID scanning system (931) and optionally at least a portion of the networking and main controller system (911). In one embodiment of the invention, the RFID scanning system (931) comprises a UHF RFID tag reader operatively connected to a UHF antenna, which may monitor and track animal activities in an activity measurement zone (AMZ), as described previously. Furthermore, in one embodiment of the invention, the networking and main controller system (911) comprises a GPS receiver (909), an interface controller (923), a main processor (925), a wireless modem (927), and an Ethernet controller (929). The networking and main controller system (911) is designed to manage, track, filter, and report animal activities in the activity measurement zone (AMZ) by communicating instructions and RFID Tag-related data with the RFID scanning system (931) and the database and web interface system (919).

Figure 12:
FIG. 12 shows an example of a portable main controller unit for an early alert system for livestock disease detection powered by alternative energy sources, in accordance with an embodiment of the invention.
Figure 13:
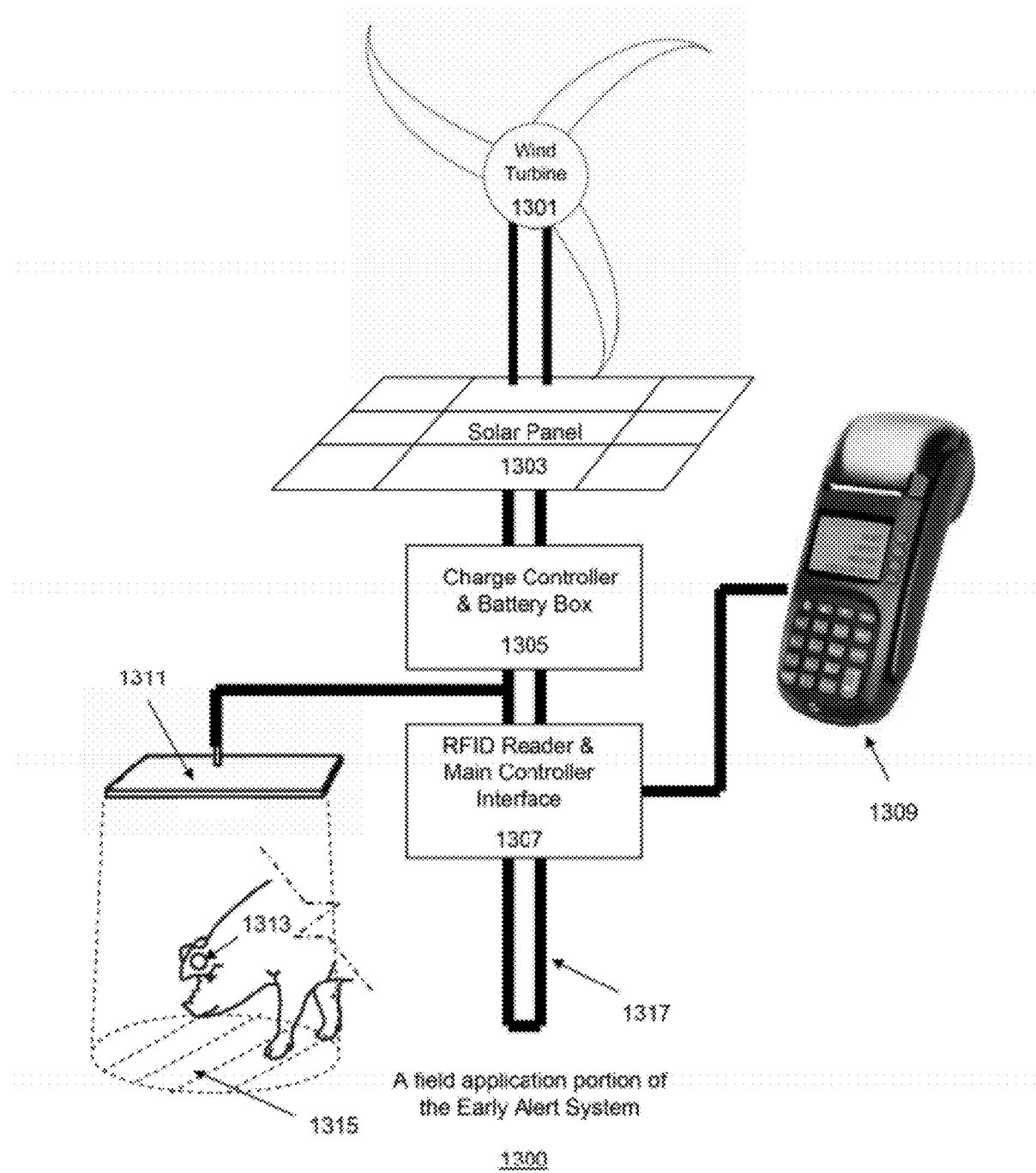
FIG. 13 shows a field application portion of an early alert system for livestock disease detection powered by alternative energy sources, in accordance with an embodiment of the invention.

In a preferred embodiment of the invention, at least some portions of the networking and main controller system (911) is a portable unit, as shown in FIG. 12 and in item 1309 of FIG. 13, wherein the portable unit is capable of communicating with the RFID scanning system (931), the power source system (921), and the database and web interface system (919) via a local area network (LAN), a cellular or satellite communication network (e.g. 917), an Internet connection, and/or a wired or wireless data connection using the Ethernet controller (e.g. 929), the wireless modem (927), and the interface controller (923) of the networking and main controller system (911). In a preferred embodiment of the invention, the portable unit utilizes RS232 or RS485 communication interfaces (e.g. 923) to communicate with at least some parts of the early alert system. Furthermore, the GPS receiver (909) may assist identifying the current location of the portable unit or another device unit relative to the RFID scanning system (931), the power source system (921), and the database and web interface system (919). In another embodiment of the invention, the networking and main controller system (911) may be entirely a fixed unit attached to one particular location, such as a wall or a device system tower.

Furthermore, some features of the networking and main controller system (911) which may be part of the portable unit include, but are not limited to, an application program executed on a microprocessor (e.g. 925) to retrieve animal activity-related RFID tag data periodically, and a user interface (e.g. a keypad, a keyboard, buttons, switches, and etc. on the portable unit) to request transmission of instructions to the RFID scanning system (931), or to request data from the RFID scanning system (931). Furthermore, in one embodiment of the invention, the portable unit associated with the networking and main controller system (911) may also control the power source system (921) for power supply adjustments, and also control data transmission to or reception from the database and web interface system (919) for operation of the early alert system for livestock disease detection.

Continuing with FIG. 9, in a preferred embodiment of the invention, the database and web interface system (919) comprises a data file server (933) and a web server (935), which may be separate computer server units or a combined integrated computer server unit. The data file server (933) may function as a network attached storage (NAS) that stores and updates animal-specific RFID tag data associated with an activity measurement zone (AMZ) as well as an analytical program module configured to set, adjust, detect, and/or use an alert trigger point for alerting a user that a particular animal requires personal attention for further medical inspection if an AMZ count for the animal over a period of time drops below the alert trigger point, as previously described for other figures. Furthermore, the web server (935) may store and operate an Internet application module to provide a user interface to control, manage, and/or visualize data or control interfaces associated with the early alert system for livestock disease detection. This user interface may be accessed by a computer terminal, a mobile device, or a networking and main controller system (e.g. 911).

In one embodiment of the invention, the analytical program module may be entirely resident on the database and web interface system (919) and execute its program routines in a CPU and a memory unit of the database and web interface system (919). In this embodiment of the invention, results from the analytical program module may be communicated with the networking and main controller system (911) via a cellular or satellite communication network (917) or another data network. In another embodiment of the invention, some portions of the analytical program module may also be executed on a main processor (e.g. 925) and a memory unit of the networking and main controller system (911), while other portions of the analytical program module may be executed on a CPU and a memory unit of the database and web interface system (919).

Figure 10:
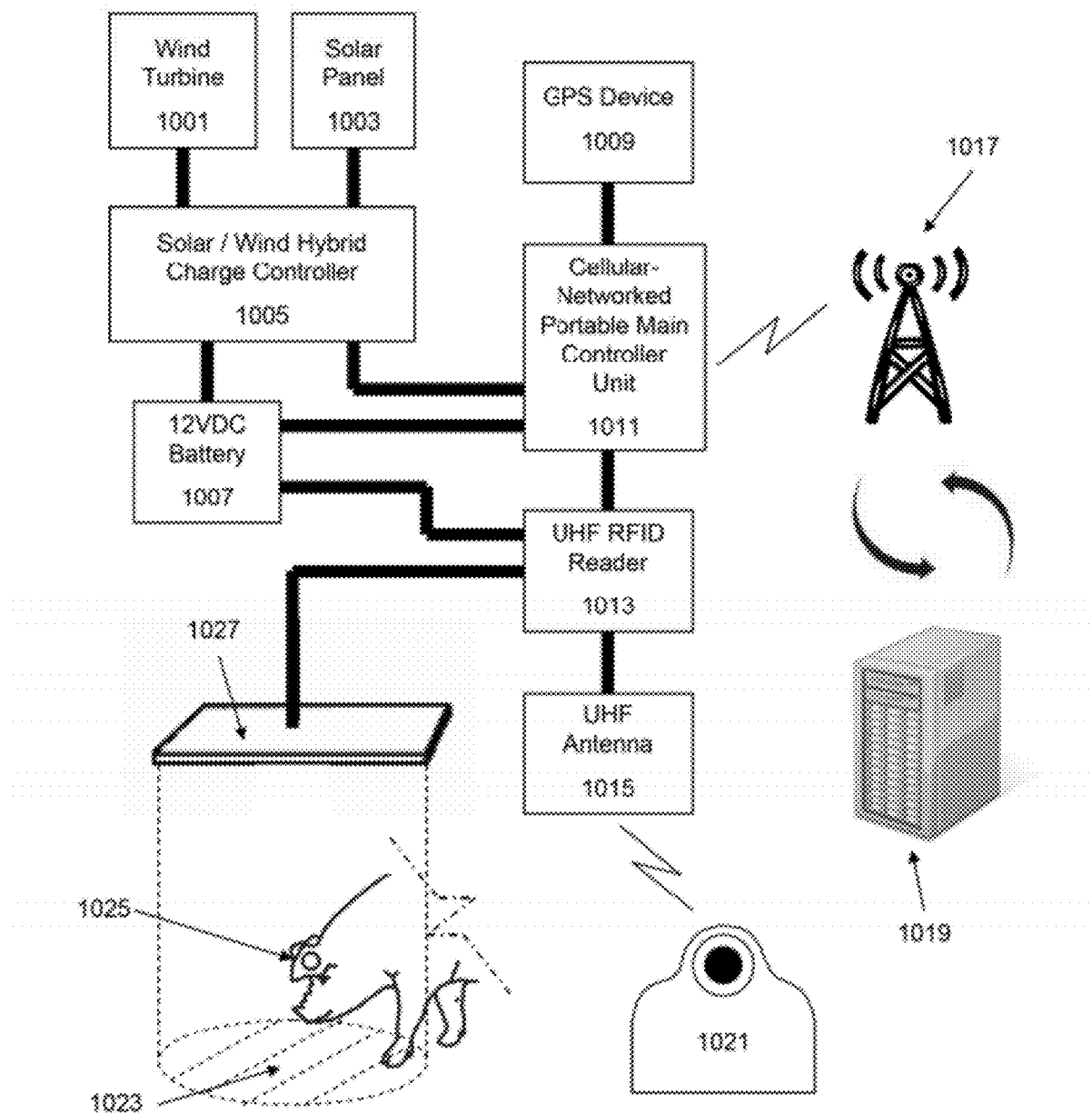
FIG. 10 shows an implemented example of an early alert system for livestock disease detection powered by alternative energy sources, in accordance with an embodiment of the invention.

FIG. 10 shows an implemented example (1000) of an early alert system for livestock disease detection powered by alternative energy sources, in accordance with an embodiment of the invention. In a preferred embodiment of the invention, the early alert system for livestock disease detection powered by alternative energy sources comprises a power source system (i.e. 1001, 1003, 1005, 1007), a networking and main controller system (i.e. 1009, 1011), an RFID scanning system (i.e. 1013, 1015, 1027), a cellular communication network (1017), and a database and web interface system server (1019). In the preferred embodiment of the invention, the power source system includes a wind turbine (1001) and a solar panel (1003), which are operatively connected to a solar/wind hybrid controller (1005). The wind turbine (1001) and the solar panel (1003) are alternative energy sources that provide electrical currents and voltages to the solar/wind hybrid charge controller (1005), which in turn converts, regulates, and controls the incoming electrical currents and voltages from the alternative energy sources for charging a rechargeable battery unit (1007).

In the preferred embodiment of the invention, the wind turbine (1001) provides an alternate current (AC) and intermittent electrical energy to the solar/wind hybrid charge controller (1005), while the solar panel (1003) provides a direct current (DC) and intermittent electrical energy to the solar/wind hybrid charge controller (1005). In one embodiment of the invention, an important function of the hybrid charge controller (1005) is converting, regulating, and controlling these incoming electrical currents and voltages into an optimized form of electrical energy for charging the rechargeable battery unit (1007). In one embodiment of the invention, the solar/wind hybrid charge controller (1005) converts any incoming alternate current (AC) into direct current (DC) and also converts voltage levels to be compatible to that of the rechargeable battery unit (1007). The solar/wind hybrid charge controller (1005) also protects the rechargeable battery unit (1007) and other electrical components from dangerous or undesirable voltage and current surges, which may occur while receiving electrical energy from the alternative energy sources (e.g. 1001, 1003). In one example of an embodiment of the invention, the rechargeable battery unit (1007) operates at 12 VDC with a maximum operating current of 200 amps. In one embodiment of the invention, the wind turbine (1001) has a maximum power generation capacity of 400 Watts, and the solar panel (1003) has a maximum power generation capacity of 60 Watts.

Continuing with FIG. 10, in the preferred embodiment of the invention, the rechargeable battery unit (1007) powers at least some of the components in the RFID scanning system (i.e. 1013, 1015, 1027) and optionally at least a portion of the networking and main controller system (i.e. 1009, 1011). In one embodiment of the invention, the RFID scanning system comprises a UHF RFID tag reader (1013) operatively connected to or integrated into one or more UHF antennas (1015, 1027), which may monitor and track animal activities in an activity measurement zone (AMZ) (1023) by tracking an RFID tag (1025, 1021) attached to an animal, if the animal enters the AMZ (1023). The shape of the RFID tag may vary, depending on a type of animal or a particular nature of an RFID tag application. For example, a pig may be attached with a circular RFID tag (1025), while a cow may be attached with a rectangular RFID tag (1021).

Furthermore, in one embodiment of the invention, the networking and main controller system comprises a GPS device (1009) operatively connected to a cellular-networked portable main controller unit (1011). The GPS device (1009) may be an integrated unit within the cellular-networked portable main controller unit (1011) in one embodiment of the invention. Alternatively, the GPS device (1009) may be a separate unit operatively connected to the cellular-networked portable main controller unit (1011) in another embodiment of the invention. In a preferred embodiment of the invention, the cellular-networked portable main controller unit (1011) includes a data interface controller (e.g. 923 of FIG. 9, which may utilize RS 232 or RS485 protocols), a main processor (e.g. 925 of FIG. 9), a wireless modem (e.g. 927 of FIG. 9), and an Ethernet controller (e.g. 929 of FIG. 9). In the preferred embodiment of the invention, the cellular-networked portable main controller unit (1011) also includes a memory unit to execute application programs and an internal battery to power the components in the cellular-networked portable main controller unit (1011). The networking and main controller system (i.e. 1009, 1011) is designed to manage, track, filter, and report animal activities in the activity measurement zone (AMZ) (1023) by communicating instructions and RFID Tag-related data with the RFID scanning system (i.e. 1013, 1015, 1027) and a database and web interface system server (1019).

In a preferred embodiment of the invention, the cellular-networked portable main controller unit (1011) is a portable unit capable of communicating with other parts of the early alert system for livestock disease detection, as shown in FIG. 12 and in item 1309 of FIG. 13. The cellular-networked portable main controller unit (1011) may accomplish communication with other parts of the early alert system via a local area network (LAN), a cellular communication network (e.g. 1017), an Internet connection, and/or a wired or wireless data connection by using an Ethernet controller (e.g. 929 of FIG. 9), a wireless modem (e.g. 927 of FIG. 9), and a interface controller (e.g. 923 of FIG. 9) within the networking and main controller system (i.e. 1009, 1011). Furthermore, the GPS device (1009) may assist identifying the current location of the cellular-networked portable main controller unit (1011) or another device unit relative to other parts of the early alert system.

Furthermore, some features of the cellular-networked portable main controller unit (1011) include, but are not limited to, an application program executed on its microprocessor to retrieve animal activity-related RFID tag data periodically, and a user interface (e.g. a keypad, a keyboard, buttons, switches, and etc. on the portable unit) to request transmission of instructions to the RFID scanning system (i.e. 1013, 1015, 1027), or to request data from the RFID scanning system (i.e. 1013, 1015, 1027). Moreover, in one embodiment of the invention, the cellular-networked portable main controller unit (1011) may also control the power source system (i.e. 1001, 1003, 1005, 1007) for power supply adjustments, and also control data transmission to or reception from the database and web interface system server (i.e. 1019) for operation of the early alert system for livestock disease detection.

Continuing with FIG. 10, in a preferred embodiment of the invention, the database and web interface system server (1019) carries the functionality of a data file server (e.g. 933 of FIG. 9) and a web server (e.g. 935 of FIG. 9) as a single computer server unit. In another embodiment of the invention, the data file server and the web server may be separate computer server units. The database and web interface system server (1019) may function as a network attached storage (NAS) that stores and updates animal-specific RFID tag data associated with an activity measurement zone (AMZ) (1023), while also being capable of executing an analytical program module configured to set, adjust, detect, and/or use an alert trigger point for alerting a user that a particular animal requires personal attention for further medical inspection if an AMZ count for the animal over a period of time drops below the alert trigger point, as previously described for other figures. Furthermore, the database and web interface system server (1019) may store and operate an Internet application module to provide a user interface to control, manage, and/or visualize data or control interfaces associated with the early alert system for livestock disease detection. This user interface may be accessed by a computer terminal, a mobile device, or a cellular-networked portable main controller unit (1011).

In one embodiment of the invention, the analytical program module may be entirely resident on the database and web interface system server (1019) and execute its program routines in a CPU and a memory unit of the database and web interface system server (1019). In this embodiment of the invention, results from the analytical program module may be communicated with the cellular-networked portable main controller unit (1011) via a cellular communication network (1017) or another data network. In another embodiment of the invention, some portions of the analytical program module may also be executed on a main processor and a memory unit of the cellular-networked portable main controller unit (1011), while other portions of the analytical program module may be executed on a CPU and a memory unit of the database and web interface system server (1019).

Figure 11:
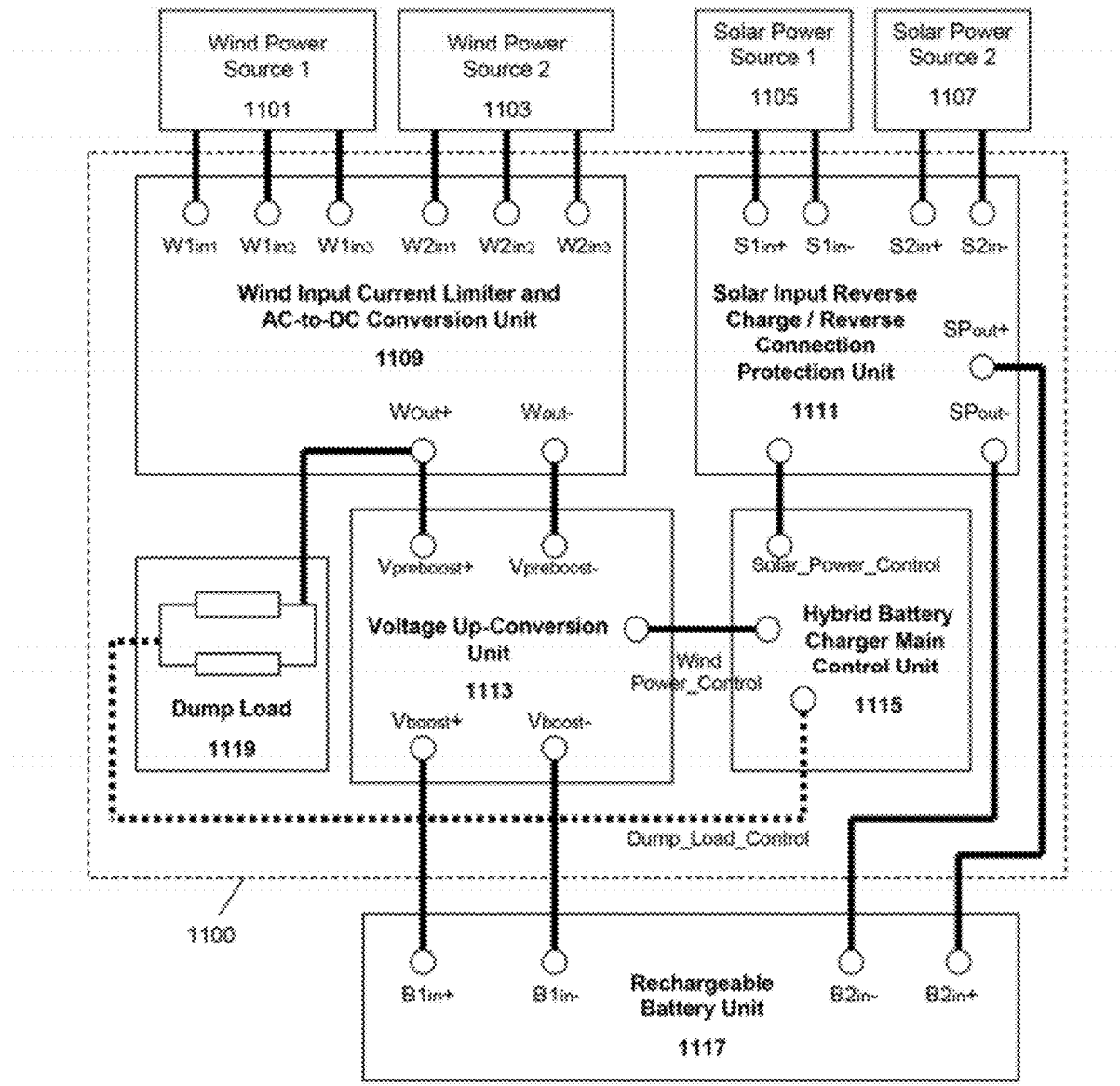
FIG. 11 shows an embodiment of a hybrid charge controller for an early alert system for livestock disease detection powered by alternative energy sources, in accordance with an embodiment of the invention.

FIG. 11 shows an embodiment of a hybrid charge controller (1100) for an early alert system for livestock disease detection powered by alternative energy sources, in accordance with an embodiment of the invention. In a preferred embodiment of the invention, the hybrid charge controller (1100) is operatively connected to alternative energy sources such as wind power sources (1101, 1103) and solar power sources (1105, 1107) to receive electrical energy. The hybrid charge controller (1100) is capable of converting, regulating, and controlling incoming electrical currents and voltages from the alternative energy sources into an optimized level of electrical energy for charging the rechargeable battery unit (1117). The hybrid charge controller (1100) may be also capable of providing over-charge protection, over-discharge protection, and high wind speed auto-brake functions for wind power sources (1101, 1103). In the preferred embodiment of the invention, the hybrid charge controller (1100) comprises a wind input current limiter and AC-to-DC conversion unit (1109), a voltage up-conversion unit (1113), a dump load unit (1119), a solar input reverse charge/reverse connection protection unit (1111), and a hybrid battery charger main control unit (1115).

In one embodiment of the invention, one or more wind power sources (1101, 1103) are wind turbines, which intermittently generate electrical energy in form of alternate current (AC) and electrical voltage, depending on the availability and the strength of wind near the wind turbines. The electrical energy generated from the wind power sources (1101, 1103) is then transmitted to the wind input current limiter and AC-to-DC conversion unit (1109) in the hybrid charge controller (1100), wherein the wind input current limiter and AC-to-DC conversion unit (1109) limits any excessive electrical current or dangerous current or voltage surges from the wind power sources (1101, 1103). In a preferred embodiment of the invention, the one or more wind power sources (1101, 1103) output three-phase AC in three terminals per wind turbine, as shown by three-terminal inputs in the wind input current limiter and AC-to-DC conversion unit (1109). The wind input current limiter and AC-to-DC conversion unit (1109) also converts the incoming alternate current (AC) from the wind power sources (1101, 1103) into a direct current (DC), which is typically more compatible for charging a battery unit. In a preferred embodiment of the invention, dangerously excessive electrical current or current surges can be diverted to a "dump load" unit (1119), which can consume excess electrical energy associated with excessive electrical current or current surges. In the preferred embodiment of the invention, the dump load unit (1119) comprises resistor elements, which effectively dissipate a large amount of excessive electrical energy into heat.

In a preferred embodiment of the invention, the electrical energy from the wind power sources (1101, 1103), which is converted into DC from the wind input current limiter and AC-to-DC conversion unit (1109), is then up-converted to a higher voltage to be compatible with the rechargeable battery unit (1117) in the voltage up-conversion unit (1113). In one example, the voltage up-conversion unit (1113) may transform a lower DC voltage from the wind input current limiter and AC-to-DC conversion unit (1109) (i.e. received at Vpreboost+ and Vpreboost− terminals at the voltage up-conversion unit (1113)) to 12 VDC at Vboost+ and Vboost− output terminals of the voltage up-conversion unit (1113), which may be an operating voltage of the rechargeable battery unit (1117). After completing the voltage and current regulation, the AC-to-DC conversion, and the voltage up-conversion in the wind input current limiter and AC-to-DC conversion unit (1109) and the voltage up-conversion unit (1113), the electrical energy originating from the wind power sources (1101, 1103) is operatively transmitted to the rechargeable battery unit (1117) for charging the rechargeable battery unit (1117) to power the early alert system for livestock disease detection.

Continuing with FIG. 11, in one embodiment of the invention, one or more solar power sources (1105, 1107) are solar panels, which intermittently generate electrical energy in form of direct current (DC) and electrical voltage, depending on the availability and the intensity of sun shining on the solar panels. The electrical energy generated from the solar power sources (1105, 1107) is then transmitted to the solar input reverse charge/reverse connection protection unit (1111) in the hybrid charge controller (1100). In a preferred embodiment of the invention, the solar input reverse charge/reverse connection protection unit (1111) stops or limits accidental reverse charging or reverse connection from the solar power sources (1105, 1107) to protect the hybrid charge controller (1100) from damage. Furthermore, in the preferred embodiment of the invention, the electrical energy received from the solar power sources (1105, 1107) may be further regulated and/or converted to optimal voltage and/or current levels in the solar input reverse charge/reverse connection protection unit (1111). Then, the regulated and/or converted electrical energy outputted from SPout+ and SPout− terminals of the solar input reverse charge/reverse connection protection unit (1111) is operatively transmitted to the rechargeable battery unit (1117) for charging the rechargeable battery unit (1117) to power the early alert system for livestock disease detection.

In the preferred embodiment of the invention, a hybrid battery charger main control unit (1115) is configured to provide operational control to all components of the hybrid charge controller (1100), including the wind input current limiter and AC-to-DC conversion unit (1109), the voltage up-conversion unit (1113), the dump load unit (1119), and the solar input reverse charge/reverse connection protection unit (1111). For example, the hybrid battery charger main control unit (1115) is able to control transmission, conversion, and/or regulation of incoming electrical energy from the wind power sources (1101, 1103) and the solar power sources (1105, 1107). Examples of control-related connections are shown as "Solar_Power_Control," "Wind_Power_Control," and "Dump_Load_Control" in FIG. 11. The hybrid battery charger main control unit (1115) can also control a charging level, a charging status, and/or a charging availability of the rechargeable battery unit (1117).

In a preferred embodiment of the invention, a networking and main controller unit (e.g. 911 of FIG. 9, 1011 of FIG. 10, 1200 of FIG. 12) may provide a user interface to access and instruct the hybrid battery charger main control unit (1115). Furthermore, the hybrid battery charger main control unit (1115) may additionally incorporate or associate with a communication interface such as RS232, RS485, wireless/wired LAN, or other communication protocols for enabling data communication between the hybrid charge controller (1100) and the networking and main controller unit.

FIG. 12 shows an example of a portable main controller unit (1200) for an early alert system for livestock disease detection powered by alternative energy sources, in accordance with an embodiment of the invention. In a preferred embodiment of the invention, the portable main controller unit (1200) comprises a display screen (1203) configured to display user interface menus and RFID Tag-related data, and a keypad interface (1205) for entering instructions, requests, data, or queries to one or more components of the early alert system for livestock disease detection. In particular, the portable main controller unit (1200) may be useful for sending a user request to initialize or reset an RFID tag reader or other components of the early alert system. The portable main controller unit (1200) may be also useful for RFID tag data read or write processing, which may be completed via a physical data port connection or via a wireless connection such as a cellular network, a LAN, and/or the Internet. Optionally, the portable main controller unit (1200) may also include a printer interface (1201) to print any desired data from the portable main controller unit (1200), and a data card interface (1207) as an input/output port for information entered into or extracted from the portable main controller unit (1200).

In the preferred embodiment of the invention, the portable main controller unit (1200) features an auto power-on system and may not even require a separate power switch. Furthermore, in the preferred embodiment of the invention, the portable main controller unit (1200) also includes a GPS receiver (e.g. 909 of FIG. 9 or 1009 of FIG. 10) to make location tracking of the portable main controller convenient relative to other components of the early alert system. In addition, in the preferred embodiment of the invention, the portable main controller unit (1200) also integrates a wireless LAN and a cellular modem such as a GPRS (general packet radio service) modem, a 3G cellular modem, or a 4G cellular modem for communicating with various components of the early alert system, including the data file server and the web server of the database and web interface system (e.g. 919 of FIG. 9). In one embodiment of the invention, the portable main controller unit (1200) may be powered by a rechargeable battery, a 12 VDC power adaptor, or a 8.2 VDC power adaptor.

FIG. 13 shows a field application portion (1300) of an early alert system for livestock disease detection powered by alternative energy sources, in accordance with an embodiment of the invention. In a preferred embodiment of the invention, the field application portion (1300) comprises some components of the early alert system which will be present in livestock farm premises. As shown in FIG. 13, in one example of an embodiment of the invention, the field application portion (1300) comprises a wind turbine (1301), a solar panel (1303), a charge controller & battery box (1305), an RFID tag reader & main controller interface unit (1307), and an RFID antenna (1311), which are attached to an early alert system post (1317). The wind turbine (1301) and the solar panel (1303) are also operatively connected to a charge controller & battery box (1305), which regulates, converts, and stores electrical energy from the wind turbine (1301) and the solar panel (1303) in a rechargeable battery unit (e.g. 1117 of FIG. 11).

In the example shown in FIG. 13, the rechargeable battery unit in the charge controller & battery box (1305) is configured to power the RFID tag reader & main controller interface unit (1307) and the RFID antenna (1311). As described previously for other figures, the RFID antenna (1311) and the RFID tag reader in RFID tag reader & main controller interface unit (1307) can define an activity measurement zone (AMZ) (1315) and track the number of entries or exits of an animal attached with an RFID tag (1313) into the AMZ (1315). In some embodiments of the invention, it may be also desirable to utilize motion sensors to define the AMZ (1315) more accurately or to achieve energy savings for the RFID antenna (1311) and the RFID tag reader & main controller interface unit (1307).

As shown in FIG. 13, a portable main controller unit (1309), which may be identical or similar to a portable main controller unit (1200) described for FIG. 12, is used to control certain components of the early alert system using a physical connection or a wireless connection. For example, the portable main controller unit (1309) may be connected to the RFID tag reader & main controller interface unit (1307) by a physical connection (e.g. RS232, or another data interface protocol) or a wireless connection (e.g. wireless LAN, Bluetooth, cellular network communication, and etc.). The portable main controller unit (1309) may also transmit data to or request data from the RFID tag (1313), or the RFID tag reader & main controller interface unit (1307). In one embodiment of the invention, the portable main controller unit (1309) may be contained inside a housing which also contains the RFID tag reader & main controller interface unit (1307). In another embodiment of the invention, the portable main controller unit (1309) may be a standalone unit designed to communicate with the early alert system post (1317) remotely using wireless data communication protocols. Yet in another embodiment of the invention, the main controller unit (e.g. 1309) may be a fixed stationary unit physically attached to the RFID tag reader & main controller interface unit (1307).

Furthermore, in one embodiment of the invention, the RFID antenna (1311) provides a minimum of 6 dB of gain at an operating frequency of 902~928 MHz, and the RFID tag reader in the RFID tag reader & main controller interface unit (1307) is a four-channel fixed system capable of simultaneous RFID tag reads and writes, with a maximum 30 dBm of RF power. In this embodiment of the invention, the wind turbine (1301) has 5 blades and can generate up to 400 Watts of power at 12 Volts, and the solar panel (1303) can generate up to 120 Watts of power at 12 Volts with a maximum current of 7.05 Amps. Moreover, the field application portion (1300) of the early alert system as shown in FIG. 13 can be equipped with a rechargeable battery capable of providing three days-worth of operational power to the field application portion (1300) of the early alert system even without any recharging of the rechargeable battery from the wind turbine (1301) or the solar panel (1303). In order to meet this operational preference, it may be desirable to use a rechargeable battery operating at 12 VDC and 200 Amps. In addition, the field application portion (1300) of the early alert system can be designed to be water-resistant and weather-resistant, as it may be desirable to have a durable unit for livestock farm applications that require only minimum operational maintenance.

Figure 14:
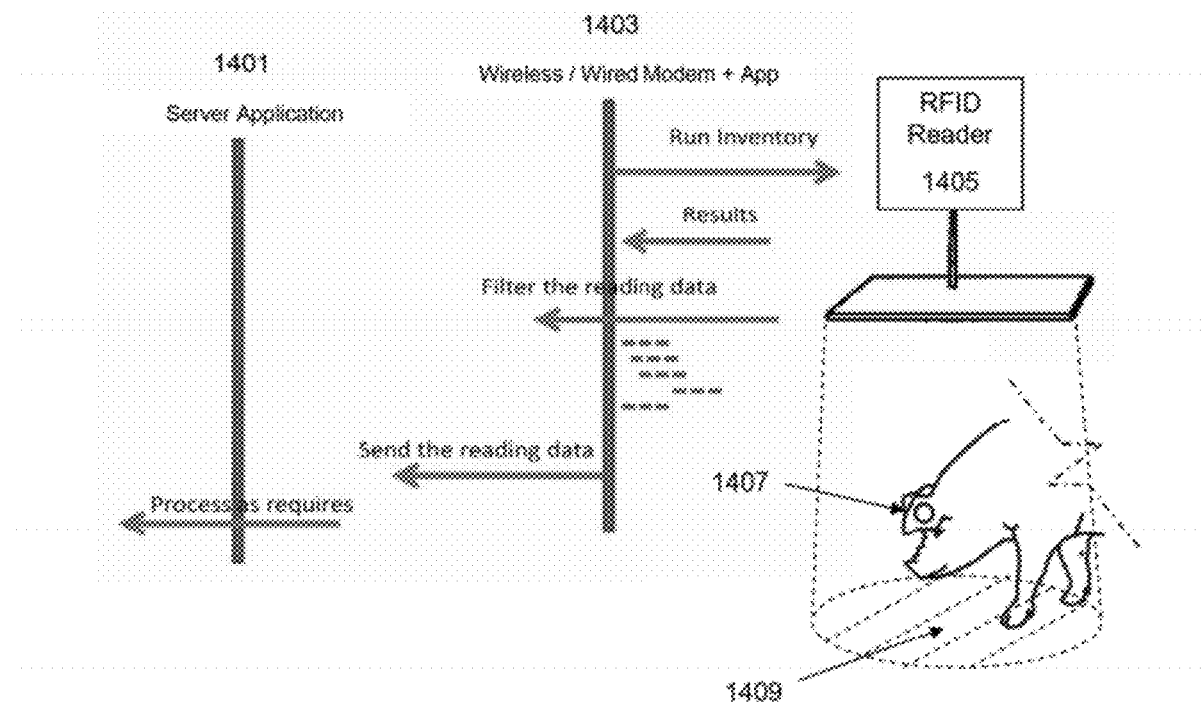
FIG. 14 shows an example of a system application flow diagram for an early alert system for livestock disease detection, in accordance with an embodiment of the invention.

FIG. 14 shows an example of a system application flow diagram (1400) for an early alert system for livestock disease detection in accordance with an embodiment of the invention. In a preferred embodiment of the invention, a portable or fixed main controller unit (e.g. 1309 of FIG. 13), which is conceptually located at "Wireless and/or Wired Modem+ App" layer (1403), may initiate a user's "run inventory" request to an RFID tag reader (1405) operatively connected to an RFID antenna. This RFID antenna can define an activity measurement zone (AMZ) (1409) and access or modify information in an RFID tag (1407) attached to an animal, if the animal is within the AMZ (1409).

In one embodiment of the invention, the user's "run inventory" request is processed by the RFID tag reader (1405)

and/or other components associated with the networking and main controller system (e.g. 911 of FIG. 9), and resulting data are returned to the main controller unit at "Wireless and/or Wired Modem+App" layer (1403), as shown in FIG. 14. The resulting data can be filtered or refined by an application program executed on the portable main controller unit (1405), and the refined "reading data" can be transmitted to a "server application" layer (1401), which is located at a data file server and/or a web server in a database and web interface system (e.g. 919 of FIG. 9) via a cellular communication network.

FIG. 15 shows an example of a report table format (1500) for an early alert system for livestock disease detection in accordance with an embodiment of the invention. In this embodiment of the invention, the report table format (1500) is generated, filtered, and/or refined by the networking and main controller system (e.g. 911 of FIG. 9), the RFID scanning system (e.g. 931 of FIG. 9), and/or the database and web interface system (e.g. 919 of FIG. 9). The report table format (1500) may contain a list of electronic product codes (EPC's) or unique RFID tag numbers (e.g. "B10001," "B10002," and etc.) in a first column (1501). The report table format (1500) may also contain a list of activity measurement zone (AMZ) accesses by a particular animal defined by a particular EPC or RFID tag number. Preferably, this list of AMZ accesses is further categorized by time, as shown in a second column (1503) in the report table format (1500). In a preferred embodiment of the invention, AMZ accesses for an animal attached with a specific RFID tag may be recorded periodically (e.g. every two minutes) and categorized in the second column (1503) accordingly. In addition, the report table format (1500) may also contain a total count of AMZ accesses by a particular animal, as shown in a third column (1505). As previously described in other figures, a sudden drop in a total count of AMZ accesses by a particular animal may indicate a potential health problem for that animal. An embodiment of the early alert system for livestock disease detection as described in the present invention is able to flag a particularly alarming drop in AMZ accesses by a potentially sick animal, and report to a user of the early alert system in the report table format (1500) as shown in FIG. 15, or in another method of alert, such as an email alert, a text alert, or a telephone call alert.

One or more embodiments of the early alert system and method for livestock disease detection have been illustrated in FIGS. 1-15 and described above. The present invention provides numerous advantages over conventional manual inspection of animals for determination of need for medical attention. For example, one or more embodiments of the present invention uniquely enable largely-automated early alert for a particular animal's alarming level of inactivity, which is likely to be a sign for sickness or deterioration of health. By defining an activity measurement zone (AMZ) inside or near an incentive such as food or water, and by tracking and counting the particular animal's entry to or exit from the AMZ with an RFID tag reader and an RFID tag uniquely assigned to the particular animal, various embodiments of the present invention also make proactive and early alert possible for a potential livestock disease.

Furthermore, various embodiments of this early alert system can save farmers' unnecessary manual inspection time and manpower for a large group of animals and enable them to focus on particularly alarming levels of inactivity for certain animals flagged by the early alert system. Moreover, public health may be better protected with this early alert system for livestock disease detection in livestock farms, because the early alert system is likely to prevent the spread of an infectious disease on the livestock population well before reaching the threshold point of "no return" in exponential spread of the infectious disease, as discussed in FIG. 4.

In addition, in some embodiments of the invention, as shown and described for FIGS. 9~15, powering the early alert system with alternative energy sources enables convenient installation of the early alert system for livestock disease detection in remote or rural areas (e.g. a remotely-located rural livestock farm), where access to conventional electrical power lines and outlets may be difficult, costly, or inconvenient. Furthermore, by utilizing alternative energy sources, this embodiment of the present invention is also environmentally-friendly and energy efficient.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An early alert system for livestock disease detection at least partially powered by alternative energy sources, the early alert system comprising:
   an activity measurement zone (AMZ) defined by an RFID signal projection from an RF antenna operatively connected to an RFID tag reader;
   an incentive device located near or inside the AMZ to encourage an animal attached with an RFID tag to enter and exit the AMZ periodically or frequently;
   the RFID tag reader configured to read from or write to the RFID tag attached to the animal when the animal is inside the AMZ defined by the RFID signal projection from the RF antenna;
   a power source system comprising a wind turbine, a solar panel, a hybrid charge controller, and a rechargeable battery unit, wherein the hybrid charge controller regulates and converts electrical energy received from the wind turbine and the solar panel to compatible voltage and current levels expected by the rechargeable battery unit, and wherein the hybrid charge controller then transmits the regulated and converted electrical energy to the rechargeable battery unit;
   a portable or fixed main controller unit connected to the hybrid charge controller, and is configured to control, request data from, or send data to the hybrid charge controller of the early alert system using a wireless connection, a physical connection, or both;
   the rechargeable battery unit connected to the hybrid charge controller, and is configured to be charged by the hybrid charge controller, wherein the rechargeable battery unit and the hybrid charge controller are also operatively connected to the RFID tag reader and the RFID antenna to provide electrical power to at least some components of the early alert system;
   a computer server with a CPU and a memory unit operatively connected to the RFID tag reader and the portable or fixed main controller unit to receive information from or transmit information to the RFID tag attached to the animal; and
   an analytical program module configured to set, adjust, detect, and use an alert trigger point for alerting a user that the animal requires personal attention for further medical inspection when an AMZ entry count for the animal over a period of time drops below the alert trigger point, wherein the analytical program module is executed on the CPU and the memory unit of the computer server, or at least partially executed on another CPU and another memory unit in the portable or fixed main controller unit.

2. The early alert system of claim 1, wherein the incentive device is a food dispenser system or a water feed.

3. The early alert system of claim 1, further comprising a wireless transceiver operatively connecting the computer server, the portable or fixed main controller unit, and the RFID tag reader for data communication.

4. The early alert system of claim 1, further comprising a user display terminal configured to display information related to the RFID tag attached to the animal, including any alerts from the analytical program module.

5. The early alert system of claim 1, wherein the computer server is a desktop computer or a laptop computer, which integrates a user display terminal.

6. The early alert system of claim 1, wherein the RFID tag is a battery-less passive tag, and wherein the RFID tag comprises a non-volatile memory unit and an embedded RF antenna unit.

7. The early alert system of claim 1, wherein the AMZ count is tracked and counted for the animal by the analytical program module executing on the CPU and the memory unit of the computer server.

8. The early alert system of claim 1, wherein the alert trigger point is either manually set by the user or statistically determined by the analytical program module executing on the CPU and the memory unit of the computer server.

9. The early alert system of claim 1, wherein the action of alerting the user for further medical inspection of the animal involves transmitting a phone alert, an email alert, a text message, or an alert display on a display terminal.

10. The early alert system of claim 1, wherein the RFID tag or the computer server stores at least some of information comprising a unique tag identification code for the animal, a type or grade of the animal, the animal's date of birth, gender, owner, and vaccine records.

11. The early alert system of claim 10, wherein the information stored in the RFID tag or the computer server further comprises an AMZ count field.

12. The early alert system of claim 1, wherein the portable or fixed main controller unit comprises a display screen, a main controller unit specific-CPU, a main controller unit-specific memory unit, a keypad interface, a wireless modem, an Ethernet controller, an RS 232 interface controller, and a GPS receiver.

13. A method of alerting a potential livestock disease to a user of an early alert system powered by alternative energy sources, the method comprising the steps of:
  powering at least some components of the early alert system using a wind turbine, a solar panel, a hybrid charge controller, and a rechargeable battery, wherein the hybrid charge controller and the rechargeable battery are operatively connected to an RFID tag reader;
  defining an activity measurement zone (AMZ) enabled by the RFID tag reader and an RF antenna operatively connected to the RFID tag reader;
  attaching an RFID tag to an animal, wherein the RFID tag reader can read from or write to the RFID tag if the RFID tag is within the AMZ;
  activating the early alert system for livestock disease detection;
  monitoring the frequency of the animal's entrance into the AMZ by accessing the RFID tag attached to the animal; and
  when an alert trigger point is reached due to an AMZ entry count for the animal dropping below the alert trigger point, informing the user of the early alert system to encourage further inspection of the animal for a potential health problem or an infection.

14. The method of claim 13, wherein the step of monitoring the frequency of the animal's entrance into the AMZ involves keeping track of the AMZ entry count over a period of time in a computer server and/or the RFID tag, and comparing the AMZ entry count against the alert trigger point.

15. The method of claim 13, wherein the optional step of informing the user to encourage further inspection of the animal involves sending an alert via a display terminal, a telephone alert, an email alert, or a text message.

16. The method of claim 13, wherein the step of defining activity measurement zone (AMZ) also involves installing an incentive device inside the AMZ or nearby.

17. The method of claim 16, wherein the incentive device is a food dispenser system or a water feed.

18. The method of claim 14, wherein the step of keeping track of the AMZ entry count over the period of time and comparing the AMZ entry count against the alert trigger point are performed by an analytical program module executed on a CPU and a memory unit of the computer server operatively connected to the RFID tag reader.

* * * * *